(12) United States Patent
Takagi et al.

(10) Patent No.: US 11,215,833 B2
(45) Date of Patent: Jan. 4, 2022

(54) VIRTUAL IMAGE DISPLAY APPARATUS

(71) Applicant: SEIKO EPSON CORPORATION, Tokyo (JP)

(72) Inventors: Masayuki Takagi, Azumino (JP); Toshiaki Miyao, Matsumoto (JP); Takashi Takeda, Suwa (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 74 days.

(21) Appl. No.: 16/743,082

(22) Filed: Jan. 15, 2020

(65) Prior Publication Data

US 2020/0225484 A1 Jul. 16, 2020

(30) Foreign Application Priority Data

Jan. 15, 2019 (JP) .............................. JP2019-004137

(51) Int. Cl.
*H04N 9/31* (2006.01)
*G02B 27/01* (2006.01)

(52) U.S. Cl.
CPC ....... *G02B 27/0172* (2013.01); *H04N 9/3152* (2013.01); *G02B 2027/0178* (2013.01)

(58) Field of Classification Search
CPC .... G03B 21/008; G03B 21/28; G03B 21/145; G03B 21/208; G03B 21/2013; G03B 21/2033; G03B 21/2053; H04N 9/3141; H04N 9/3152; H04N 9/3155; H04N 9/3161; H04N 9/3164; H04N 9/3197; G02B 27/017; G02B 27/30; G02B 27/0172; G02B 27/425; G02B 27/0966; G02B 2027/013; G02B 2027/0178; G02B 2027/0081; G02B 2027/0118; G02B 2027/0165;

(Continued)

(56) References Cited

U.S. PATENT DOCUMENTS

2007/0153238 A1* 7/2007 Takeuchi ................. G03B 9/07
353/97
2008/0055899 A1* 3/2008 Tsuyuki ............. G02B 27/0172
362/234

(Continued)

FOREIGN PATENT DOCUMENTS

JP 2017-116773 A 6/2017

*Primary Examiner* — Sultan Chowdhury
(74) *Attorney, Agent, or Firm* — Oliff PLC

(57) ABSTRACT

Provided are an imaging element configured to display an image, a projection optical system configured to project an image from the imaging element, and a two-stage structural diaphragm including a first diaphragm forming a first aperture portion in the projection optical system, and a second diaphragm forming a second aperture portion in the projection optical system, in which inclinations of a principal ray, relative to an image plane of an imaging element, of imaging light emitted from a peripheral portion of the image plane differ between in a first direction and in a second direction perpendicular to the first direction among in-plane directions of the image plane, in which the first diaphragm and the second diaphragm in the two-stage structural diaphragm are provided at different positions corresponding to differences between the inclinations of the principal ray in the first direction and in the second direction.

19 Claims, 17 Drawing Sheets

(58) Field of Classification Search
CPC ............. G02B 2027/0181; G03H 1/32; G03H 1/2205; G03H 1/2286; G03H 1/2294
See application file for complete search history.

(56) References Cited

U.S. PATENT DOCUMENTS

| | | | |
|---|---|---|---|
| 2010/0027094 A1* | 2/2010 | Ide ........................... | G03B 9/04 359/230 |
| 2013/0222384 A1* | 8/2013 | Futterer ................... | G03H 1/26 345/426 |
| 2015/0116800 A1* | 4/2015 | Yoshida ............. | G02B 27/0103 359/9 |
| 2016/0178909 A1* | 6/2016 | Komatsu .............. | G02B 17/086 345/8 |
| 2017/0184854 A1 | 6/2017 | Takagi et al. | |

* cited by examiner

VIRTUAL IMAGE DISPLAY APPARATUS

The present application is based on, and claims priority from JP Application Serial Number 2019-004137, filed Jan. 15, 2019, the disclosure of which is hereby incorporated by reference herein in its entirety.

BACKGROUND

1. Technical Field

The present disclosure relates to a virtual image display apparatus represented by a head-mounted display.

2. Related Art

As described in JP 2017-116773 A and the like, there is known a virtual image display apparatus such as a head-mounted display or the like, which includes a non-telecentric optical system including at least one asymmetric surface, where a diaphragm is provided to offer projected image with high image quality while miniaturizing the optical system. Note that the head-mounted display is also referred to as HMD below.

Unfortunately, in a configuration such as that exemplified in JP 2017-116773 A, for example, when a further wide field angle is intended to be achieved while suppressing an expansion of an optical system, or when attempting to further reduce the size of the optical system while maintaining optical accuracy, a configuration in which the diaphragm is provided only at one location may not make it possible to effectively suppress an occurrence of ghost inside and outside of a screen.

SUMMARY

A virtual image display apparatus according to an aspect of the present disclosure includes an imaging element configured to display an image, a projection optical system configured to project an image from the imaging element, and a two-stage structural diaphragm including a first diaphragm forming a first aperture portion in the projection optical system, and a second diaphragm forming a second aperture portion in the projection optical system, in which inclinations of a principal ray, relative to an image plane of an imaging element, of imaging light emitted from a peripheral portion of the image plane differ between in a first direction and in a second direction perpendicular to the first direction among in-plane directions of the image plane, in which the first diaphragm and the second diaphragm in the two-stage structural diaphragm are provided at different positions corresponding to differences between the inclinations of the principal ray in the first direction and in the second direction.

DESCRIPTION OF EXEMPLARY EMBODIMENTS

First Embodiment

A virtual image display apparatus according to a first embodiment of the present disclosure will be described below in detail with reference to FIG. 1 and the like.

Figure 1:
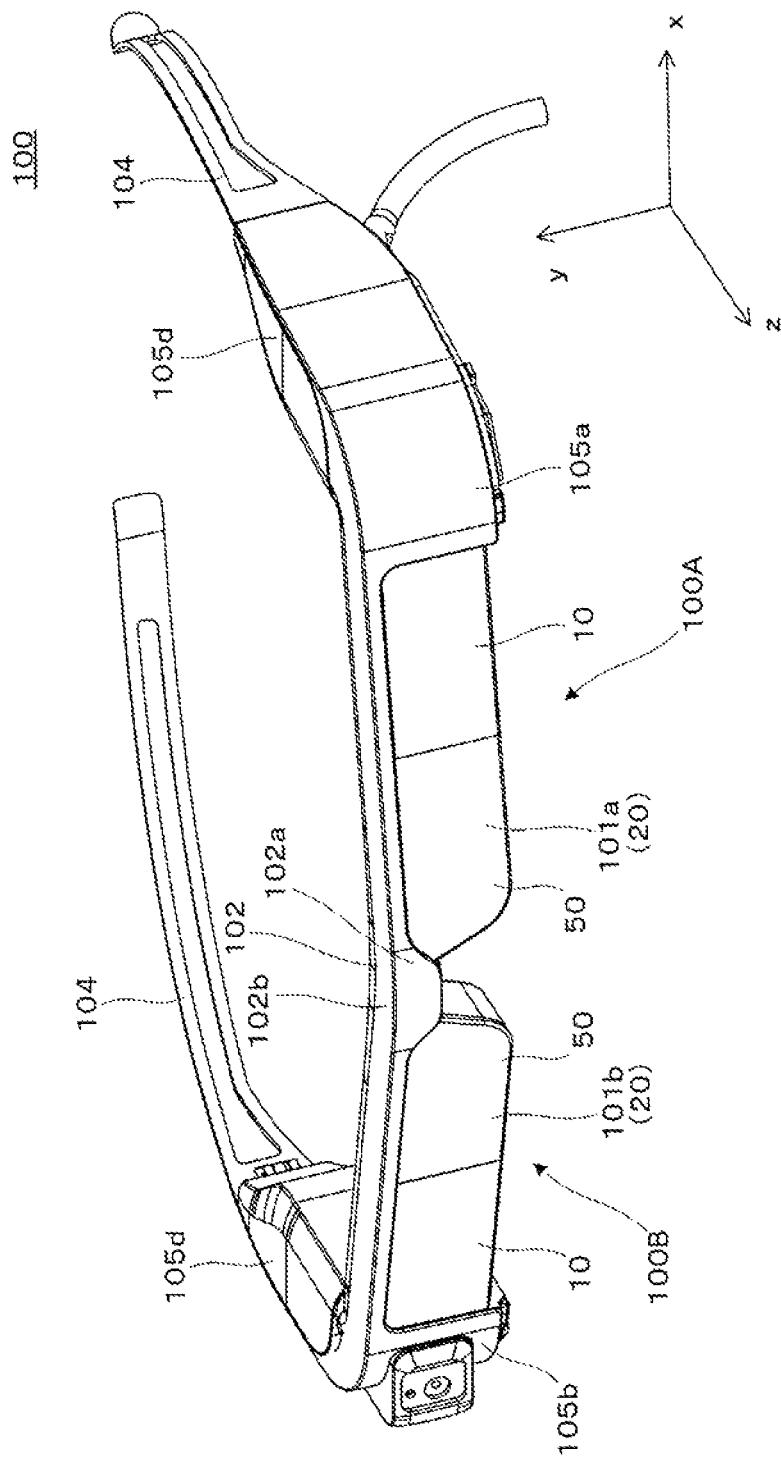
FIG. 1 is an explanatory perspective view illustrating an exterior appearance of one example of a virtual image display apparatus according to a first embodiment.

As illustrated in FIG. 1 and the like, a virtual image display apparatus 100 according to the first embodiment is a head-mounted display (HMD) having an eyeglass-like appearance. The virtual image display apparatus 100 allows an observer or user worn the virtual image display apparatus 100 to visually recognize an image light (imaging light) due to virtual image, and allows the observer to visually recognize or observe an external scene image in a see-through manner. The virtual image display apparatus 100 includes a first display device 100A, a second display device 100B, and a frame portion 102.

The first display device 100A and the second display device 100B, which are parts that form the respective virtual images for the right and left eyes, each include first and second optical members 101a and 101b that cover a front of the eyes of the observer such that the observer can see therethrough, and first and second image forming bodies 105a and 105b. The first and second image forming bodies 105a and 105b, which will be described later, are each constituted by optical systems for image formation, such as a display device (imaging element), a projection lens, and the like, and a member that houses these optical systems, and the like. Note that the display device (imaging element), the projection lens, or the like is supported and housed by being covered by an exterior member (case member) 105d of a cover-like form. The first and second optical members 101a and 101b are light-guide portions configured to guide imaging light generated in the first and second image forming bodies 105a and 105b and to allow the imaging light to be visually recognized in a superimposed manner on external light, which constitute a light-guiding device that includes a light-guiding member. Hereinafter, the first optical member 101a or the second optical member 101b is also referred to as light-guiding device 20. Note that the first display device 100A and the second display device 100B function as a virtual image display apparatus, even alone.

The frame portion 102, which is an elongated member being bent in a U-shape in a plan view, includes a middle portion 102a having a thick wall structure provided being coupled to both the first optical member 101a and the second optical member 101b, that are, a pair of light-guiding devices 20, and a support body 102b extending from the middle portion 102a along the first and second optical members 101a and 101b and further forming a portion being bent in a U-shape.

Note that a temple 104, which is a trailing portion extending rearward from both the right and left ends of the frame portion 102, is provided. The temple 104 can be used as a portion that abuts against and supports the ears, the temple, or the like of an observer.

Figure 2:
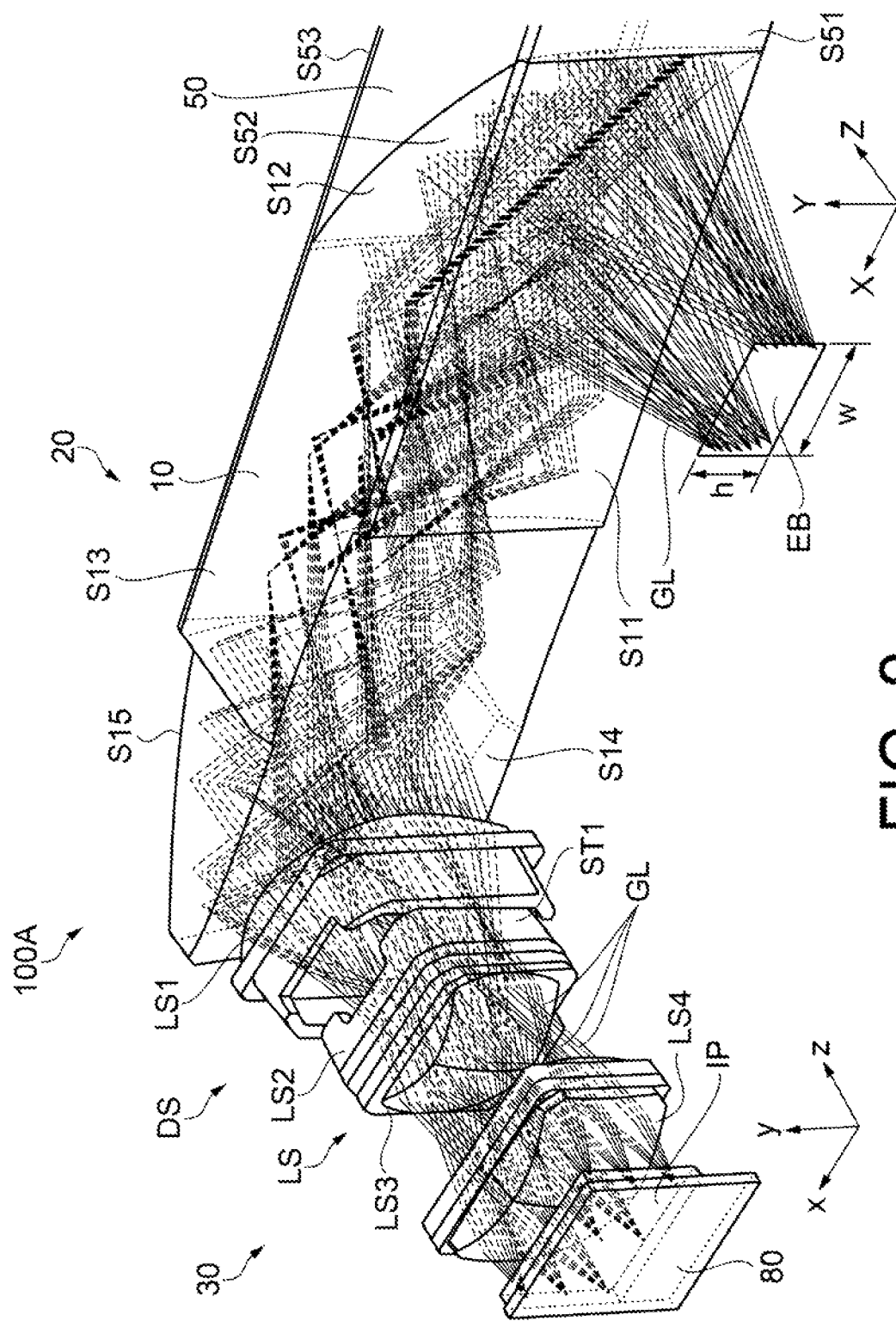
FIG. 2 is a perspective view illustrating an optical system and an optical path of imaging light in a virtual image display apparatus.
Figure 3:
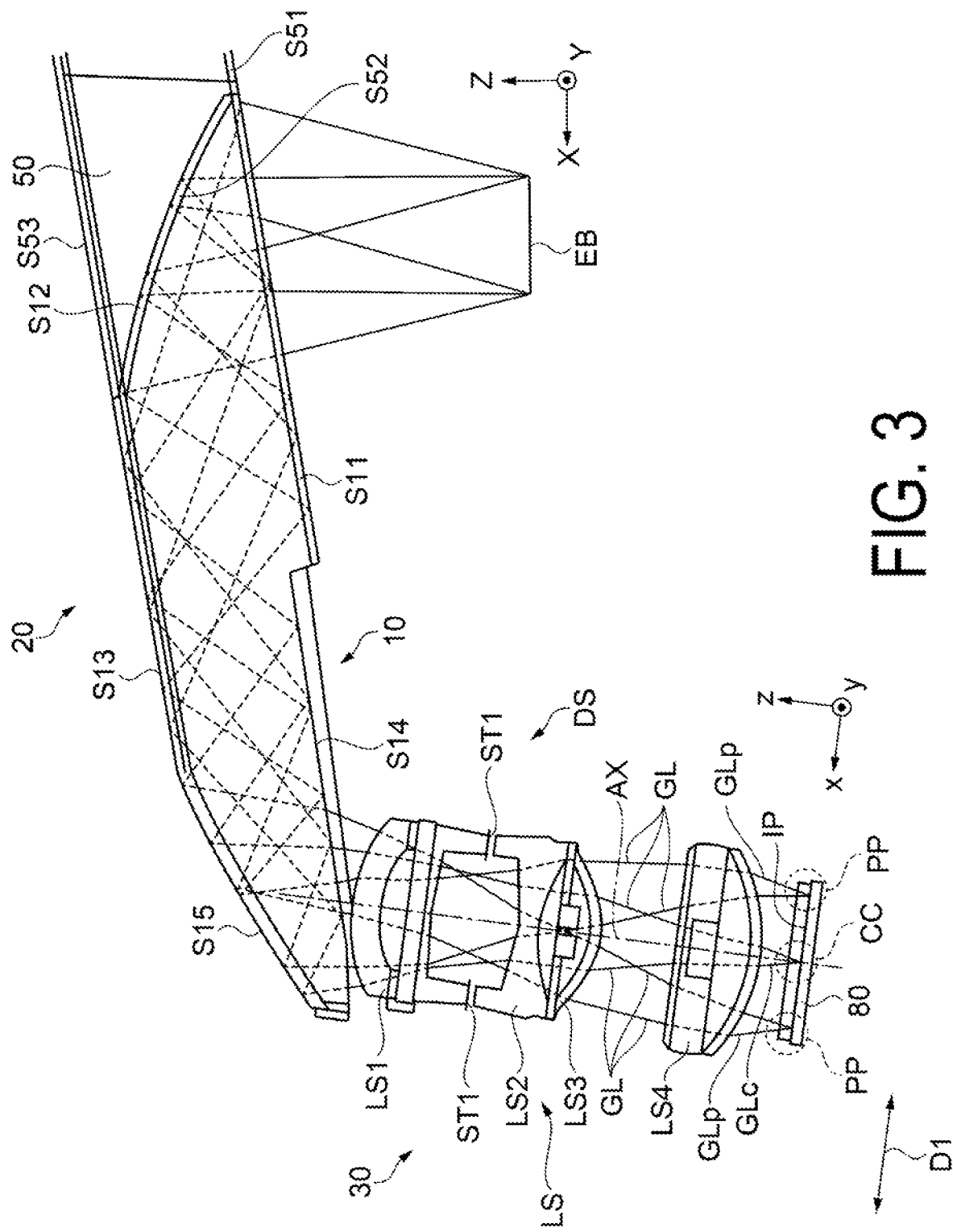
FIG. 3 is a plan view illustrating an optical system and an optical path of imaging light in a virtual image display apparatus.
Figure 4:
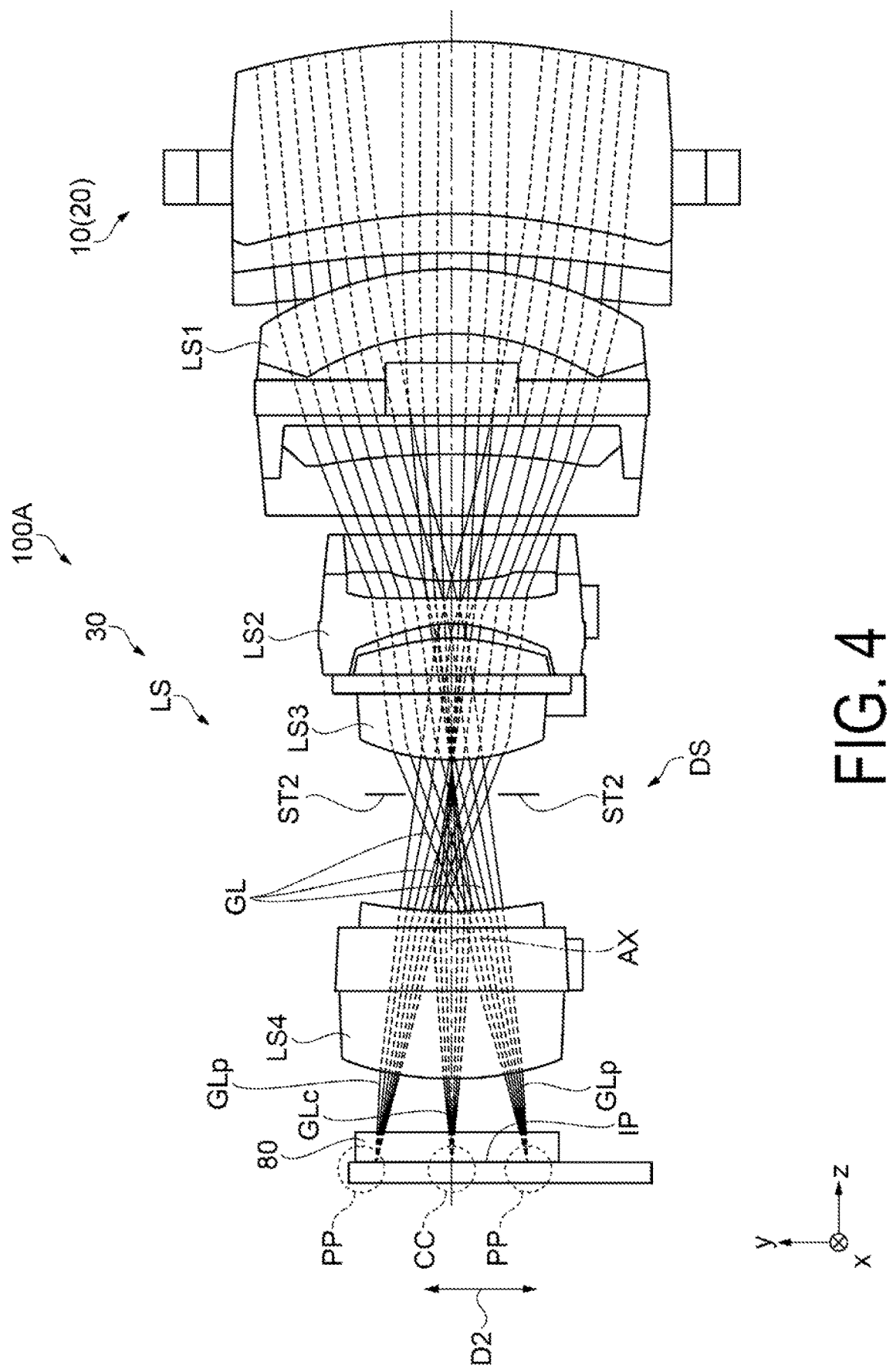
FIG. 4 is a side view illustrating an optical system and an optical path of imaging light in a virtual image display apparatus.

With reference to FIG. 2 and the like, a conceptual description of one example will be given below, about the structures and the like for performing light-guiding of imaging light by the virtual image display apparatus 100. FIGS. 2 to 4 are views illustrating a portion of the first display device 100A, which are views extracting a portion of the optical system, in particular. Note that, as already described above, the first display device 100A and the second display device 100B (see FIG. 1 and the like) serve as devices for light-guiding imaging light GL, however, since the first display device 100A and the second display device 100B have right-left symmetric and equivalent structures, descriptions of the first display device 100A will be given only, and a description of the second display device 100B will not be given.

Figure 6:
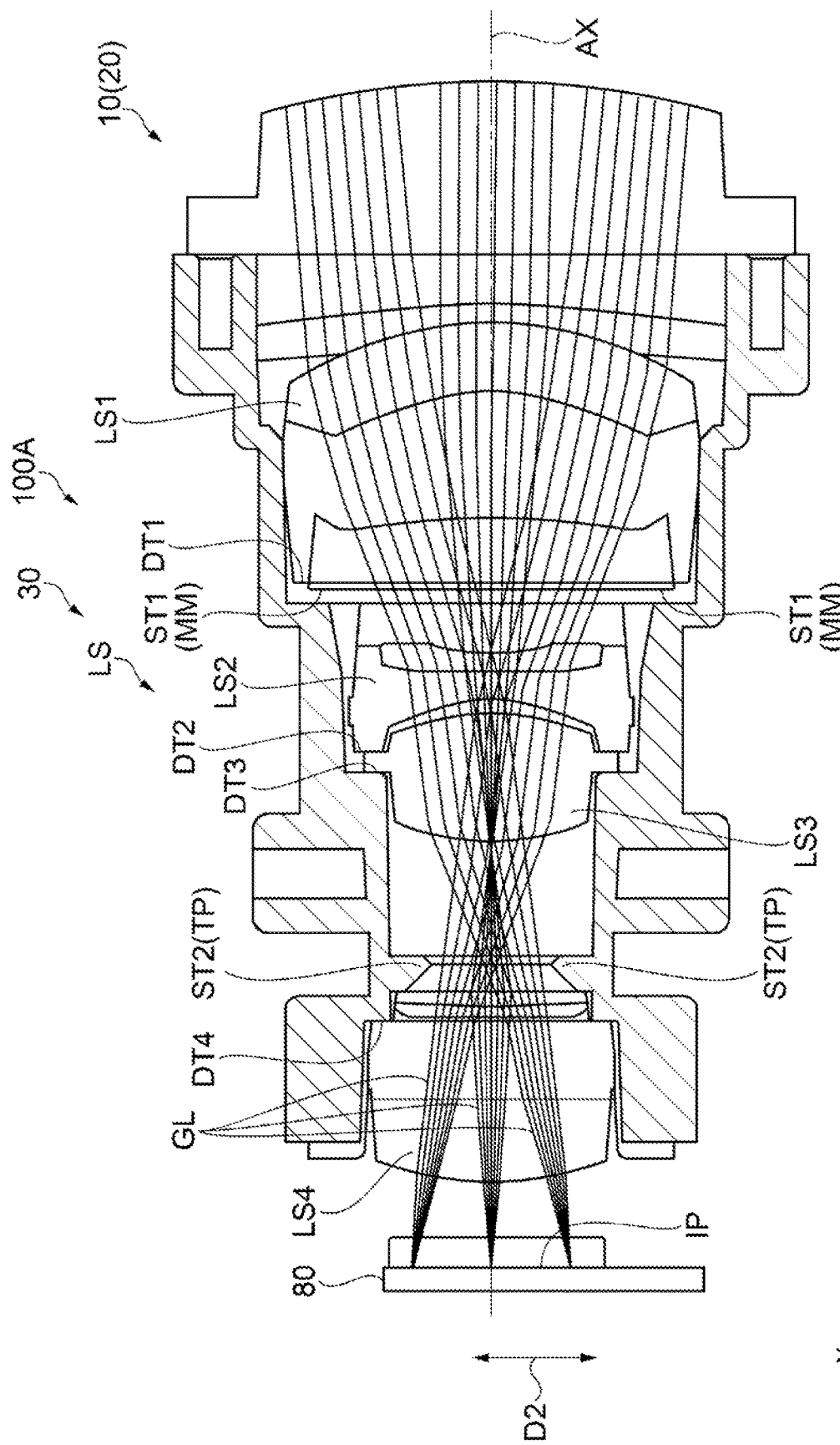
FIG. 6 is an explanatory side cross-sectional view illustrating one configuration example of a projection optical system.

As illustrated in FIGS. 2 to 4, the first display device 100A includes an image display device 80 configured to generate the imaging light GL, a projection optical system 30 including a projection lens LS for imaging housed in a lens barrel BR illustrated in FIG. 6 and the like, and a light-guiding device 20 configured to light-guide the imaging light GL having passed through the image display device 80 and the projection lens LS. The light-guiding device 20 is constituted by a light-guiding member 10 for light-guiding and see-through use, and a light transmissive member 50 for see-through use.

The image display device 80 can include, for example, an imaging element (projected image display element) constituted by a light-emitting type element such as an organic EL element. Further, the image display device 80 may be configured to include, in addition to, for example, a projected image display element being a transmission-type spatial light modulating device, an illumination device being a backlight for emitting illumination light to the projected image display element, and a driving control unit configured to control operations. Here, as illustrated in the figure, the image display device 80 which is formed in a rectangular shape, forms an image plane IP in a rectangular shape, and emits the imaging light GL from each of the positions in the image plane IP. Here, the normal direction of the image plane IP is assumed as a z-direction, where the z-direction coincides with an optical axis direction in which an optical axis AX of the projection lens LS constituting the projection optical system 30 extends. Further, one direction of the image plane IP or the image display device 80 in a rectangular shape among in-plane directions of the image plane IP, which are perpendicular to the z-direction, is assumed as a x-direction, and a direction perpendicular to the x-direction is assumed as a y-direction. It is herein noted that the longitudinal direction of the rectangular shape is the x-direction.

Figure 5:
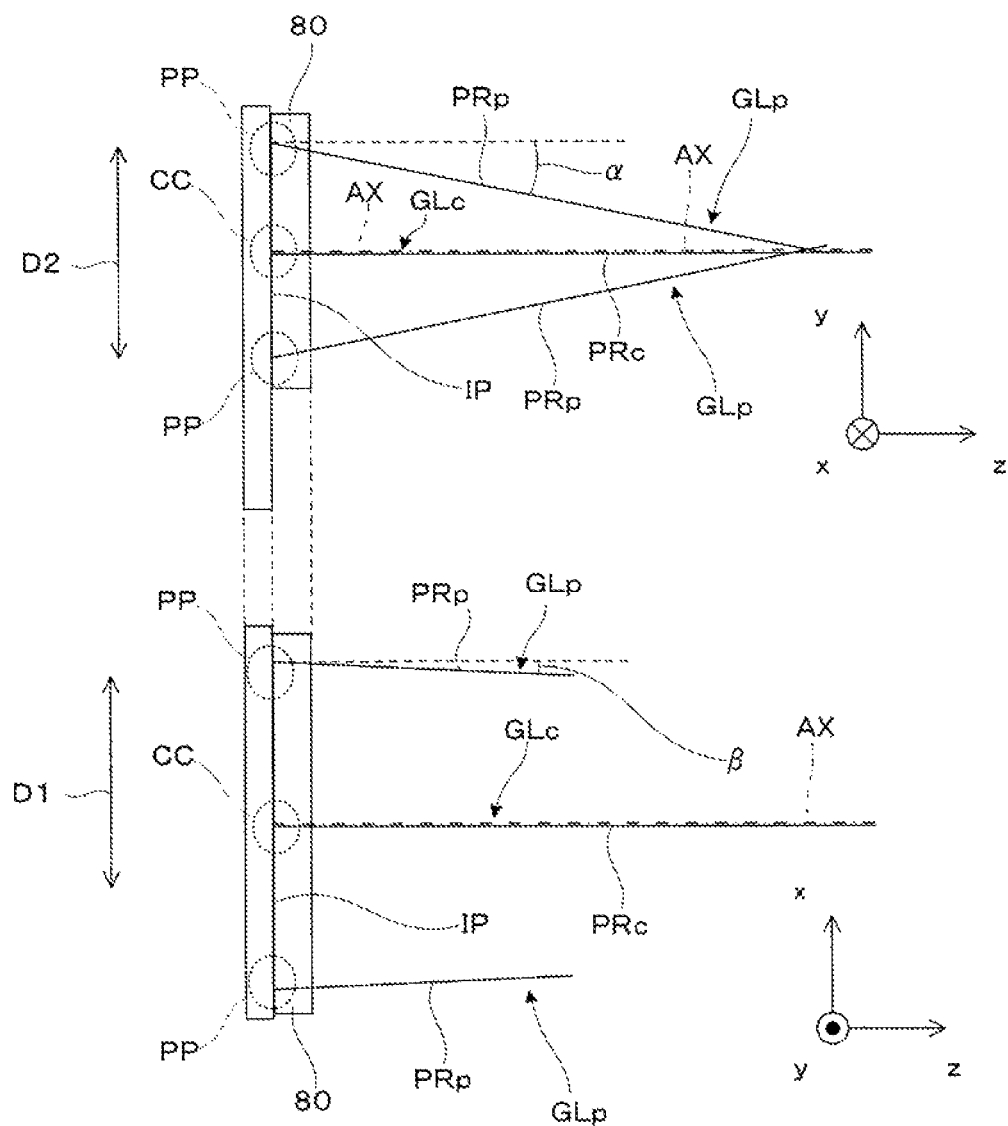
FIG. 5 is an explanatory view conceptually illustrating inclinations of a principal ray in imaging light.

In addition, in the above, as illustrated in FIGS. 3 and 4 for example, in the imaging light GL emitted from the image plane IP of the image display device 80, a principal ray of component light GLp emitted from a peripheral portion PP of the image plane IP is inclined inward compared to a principal ray of component light GLc emitted from a center portion CC of the image plane IP. In other words, a ray of the component light GLc on a center side is parallel to or substantially parallel to the optical axis AX, while a ray of the component light GLp on the peripheral side is inclined toward the center side in a manner approximating the optical axis AX. Moreover, regarding the principal rays, the inclined degree in the x-direction differs from the inclined degree in the y direction. More specifically, as illustrated in comparison in FIG. 5, in a principal ray PRp of the component light GLp, an inclination angle $\alpha$ indicating an inclination in the y-direction relative to the optical axis AX is greater than an inclination angle $\beta$ indicating an inclination in the x-direction relative to the optical axis AX. In other words, the principal ray PRp, in which a vertical emission angle indicated by the inclination angle $\alpha$ becomes greater than the inclination angle $\beta$ or a horizontal direction emission angle, is inclined in a manner oriented further inward in the vertical direction (the y-direction). Note that a principal ray PRc of the component light GLc is parallel to the optical axis AX. Hereinafter, as expressions on the inclination of the principal ray PRp, the x-direction is assumed as a first direction D1, and the y-direction is assumed as a second direction D2. That is, inclinations of the principal ray PRp, relative to the image plane IP, of the component light GLp being the imaging light GL emitted from the peripheral portion PP of the image plane IP differ between in the first direction D1 and in the second direction D2 perpendicular to the first direction D1 among in-plane directions of the image plane IP.

Referring back to FIGS. 2 to 4, the projection optical system 30 includes, as a component, the projection lens LS configured to include, for example, a plurality of optical elements (in the example illustrated in the figure, four lenses LS1 to LS4) aligned along a direction (optical axis direction; the z-direction) in which an incident side optical axis AX extends. where the projection lens LS is housed and supported by an optical component holding member (the lens barrel BR illustrated in FIG. 6 and the like). Moreover, as illustrated in FIGS. 3 and 4, the projection optical system 30 in the first embodiment is provided with, on an optical path along the incident side optical axis AX, a two-stage structural diaphragm DS including a first diaphragm ST1 relatively located downstream of the optical path and forming a first aperture, and a second diaphragm ST2 relatively located upstream of the optical path and forming a second aperture. First, as illustrated in FIG. 3, the first diaphragm ST1 is provided, when the imaging light GL is viewed in its entirety in the first direction D1, at the optimal diaphragm position at which the diameter of a luminous flux of the imaging light GL is minimized. On the other hand, as illustrated in FIG. 4, the second diaphragm ST2 is provided, when imaging light GL is viewed in its entirety in the second direction D2, at the optimal diaphragm position at which the diameter of the luminous flux of the imaging light GL is minimized. As a result, the first diaphragm ST1 and the second diaphragm ST2 are provided at different positions corresponding to differences between the inclinations of the principal ray PRp in the first direction D1 and in the second direction D2. More specifically, in the case illustrated in the figure, regarding inclinations of the principal ray PRp, along with the inclination in the second direction D2 being greater than the inclination in the first direction D1, that is, along with the inclination angle α in FIG. 5 being greater than the inclination angle R, the second diaphragm ST2 in the two-stage structural diaphragm DS is disposed, on the optical path, closer to the image display device 80 than the first diaphragm ST1 is. In other words, in the two-stage structural diaphragm DS, the first diaphragm ST1 functions as a diaphragm of the imaging light GL corresponding to the inclination in the first direction D1, and the second diaphragm ST2 functions as a diaphragm of the imaging light GL corresponding to the inclination in the second direction D2. That is, in this case, the first diaphragm ST1 serves as a diaphragm in the horizontal direction, and the second diaphragm ST2 serves as a diaphragm in the vertical direction. The two-stage structural diaphragm DS, which includes the first and second diaphragms ST1 and ST2 arranged in the above-described arrangement, suitably adjusts light to suppress an occurrence of ghost. In addition, some of the lenses LS1 to LS4 include a lens constituted by an aspheric lens including both a non-axisymmetrically shaped aspheric surface (non-axisymmetric aspherical surface) and an axisymmetrically shaped aspheric surface (axisymmetric aspherical surface). That is, the projection lens LS constitutes an asymmetric optical system. This allows the projection lens LS to form an intermediate image corresponding to a display image inside the light-guiding member 10 in cooperation with a part of the light-guiding member 10 constituting the light-guiding device 20. The projection lens LS projects the imaging light GL formed in the image display device 80 toward the light-guiding device 20 to be incident on the light-guiding device 20. Note that, although not specifically described, the lens barrel BR is housed and supported by the exterior member 105d (see FIG. 1).

In an HMD, some degree of number of lenses are required, for example, in order to improve resolution performance and distortion aberration of the respective optical systems represented by the projection optical system 30 illustrated in the figure. However, an increase of the number of lenses leads to an enlargement of the optical system. In addition, in order to reduce the size of the HMD, the distance between the lenses is required to be small as much as possible. In the first embodiment, in order to achieve a more compact optical system, a configuration is employed in which a lens is also disposed between the diaphragm positions in the vertical and horizontal directions, that is, between the first diaphragm ST1 and the second diaphragm ST2.

As already described above, the light-guiding device 20 is constituted by the light-guiding member 10 for light-guiding and see-through use, and the light transmissive member 50 for see-through use. In addition, the light-guiding device 20 is provided with a hard coat layer being a protective layer on the surface part, to cause the body member to be covered and protected. The light transmissive member 50 is a member (auxiliary optical block) that aids see-though function of the light-guiding member 10, that is, a light transmissive portion, and is integrally fixed with the light-guiding member 10 to form the light-guiding device 20 being a single component. The light-guiding device 20 is located and fixed with respect to the projection lens LS in an accurate manner by being fastened with screws to an optical component holding member such as, for example, the lens barrel BR.

The light-guiding member 10 includes first to fifth faces S11 to S15 as side faces having an optical function. Among these faces, the first face S11 is adjacent to the fourth face S14, and the third face S13 is adjacent to the fifth face S15. In addition, the second face S12 is disposed between the first face S11 and the third face S13. At a surface of the second face S12, a half mirror layer 25 is concomitantly provided. The half mirror layer 25 is a reflection film having light transmissivity (semi-transmissive reflection film) that is formed by depositing a metallic reflection film or a dielectric multilayer film, and is appropriately set with reflectivity with respect to imaging light. That is, the light-guiding member 10 includes a transmissive reflection surface covering a front of the eyes when worn by an observer.

As already described above, the light transmissive member 50, which forms the light-guiding device 20 being a single component by being integrally fixed with the light-guiding member 10, is a member (auxiliary optical block) that aids see-though function of the light-guiding member 10. The light transmissive member 50 being a light transmissive portion includes, as side faces having an optical function, a first transmissive face S51, a second transmissive face S52, and a third transmissive face S53. The second transmissive face S52 is disposed between the first transmissive face S51 and the third transmissive face S53. The first transmissive face S51 is on a surface extended from the first face S11 of the light-guiding member 10, the second transmissive face S52 is a curved surface that is jointed to and integrated with the second face S12, and the third transmissive face S53 is on a surface extended from the third face S13 of the light-guiding member 10. In other words, the first face S11 is adjacent to the first transmissive face S51, and similarly, the third face S13 is adjacent to the third transmissive face S53, and the both form a smooth surface that is in a state of being positioned flush with each other.

An optical path of the imaging light GL will be briefly described below with reference to FIG. 3. The light-guiding member 10 allows the imaging light GL to be incident from the projection lens LS, and allows the imaging light GL to be reflected at the first and fifth faces S11 to S15 and to be light-guided toward the eyes of the observer, Specifically, the imaging light GL from the projection lens LS is firstly incident on the fourth face S14 to be reflected at the fifth face S15, and is incident again from the inner side on the fourth face S14 to be totally reflected at the fourth face S14. Then, the imaging light GL is incident on the third face S13 to be totally reflected at the third face S13, and is then incident on the first face S11 to be the totally reflected at the first face S11. The imaging light GL that is totally reflected at the first face S11 is incident on the second face S12, and is partially reflected at a half mirror layer provided at the second face S12 while partially passing through the half mirror layer. Then, the imaging light GL is incident on the first face S11 again to pass therethrough. The imaging light GL having passed through the first face S11 is incident, as substantially parallel luminous fluxes, on the eyes of the observer or equivalent positions of the eyes. That is, the observer is to observe an image by the imaging light GL being virtual image.

Further, as described above, the light-guiding device 20 is configured to allow the observer to view imaging light through the light-guiding member 10, and to allow the observer to observe a distortion-less external scene image due to the cooperation between the light-guiding member 10 and the light transmissive member 50. Then, the third face S13 and the first face S11, being substantially parallel to each other (the visibility is approximately zero), scarcely causes aberration and the like to occur for the external light. Similarly, the third transmissive face S53 and the first transmissive face S51 render planes that are substantially parallel to each other. Moreover, the third transmissive face S53 and the first face S11, being planes that are substantially parallel to each other, scarcely cause aberration and the like to occur. The above causes the observer to observe a distortion-free external scene image through the light transmissive member 50.

As such, in the first embodiment, imaging light from the image display device 80 is light-guided, in the interior of the light-guiding member 10, by causing the imaging light to be reflected five times, including at least two times total reflections, from the first face S11 to the fifth face S15, as already described above. This makes it possible to satisfy both of the displaying of the imaging light and the see-through performance that cause external scene light to be visually recognized, and to perform aberration correction of the imaging light GL.

The configuration described above is the same as in the second display device 100B (see FIG. 1). This makes it possible to form images corresponding to the respective right and left eyes.

A visual recognition of a virtual image due to the virtual image display apparatus 100 will be described below. First, in the example illustrated in the figure, an eyebox EB indicating a range in which a virtual image due to the imaging light GL can be visually recognized by an observer is illustrated by a rectangular shaped plane. In general, a plane shape of the eyebox EB for real, which varies depending on the designs, is typically rendered in circular shape or square shape in many cases. In contrast, in the first embodiment, the eyebox EB has a horizontally elongated rectangular shape (h<w). As described above, the eyebox EB specifies a range in which the components of the respective imaging lights GL exited from the first face S11 in substantially parallel luminous fluxes are superimposed. That is, in order to make an image visually recognized without missing a part of the image, the eyes of the observer need to be placed within an area of a plane formed by the eyebox EB. In general, human eyes move naturally along right and left aligned in the horizontal direction and have a wide field of view. Thereby, in many cases, an elongated projected image is formed in the horizontal direction, and this is also the case to the first embodiment. Moreover, in case of right and left paired configuration as in the first embodiment, in order to eliminate the need for an eye width adjusting mechanism, some allowable range is required, due to individual difference in the width of the eyes, particularly in the horizontal direction in which the eyes are aligned in the eyebox EB. Under such a circumstance, the shape of the eyebox EB is favorably made greater in the horizontal direction in which the eyes of the observer are aligned during observation than in the vertical direction perpendicular to the horizontal direction, among in-plane directions of the plane of the eyebox EB. Note that in the illustrated figure, a Z direction indicates the normal direction of the plane of the eyebox EB, while the horizontal direction in which the eyes are aligned is indicated by an X direction, and the vertical direction is indicated by a Y direction, among the in-plane directions of the plane of the eyebox EB.

In the first embodiment, based on the above circumstance, a configuration is employed in which the imaging light GL emitted from the peripheral portion PP of the image plane IP is inclined in the second direction D2 (the y-direction) corresponding to the vertical direction (the Y direction) further than the first direction D1 (the x-direction) corresponding to the horizontal direction (the X direction), and the two-stage structural diaphragm DS including the first diaphragm ST1 and the second diaphragm ST2 that correspond to these are provided, to thus miniaturize the optical system, and, by extension, to reduce the size of the whole apparatus, while enabling projected image display with superior quality and wide field angle, and to thus suppress an occurrence of ghost, maintaining offering projected image with high image quality.

To describe the above matters in further detail, first, as already described above, the eyebox EB of the first embodiment is larger in size in the horizontal direction, while an eyebox is typically designed in a circular shape or square shape in many cases. In accordance with the above, the swallowing angle (for example, 13.5 degrees) of the imaging light GL emitted from the image display device 80 in the horizontal direction is greater than the swallowing angle (for example, 7.5 degrees) of the imaging light GL in the vertical direction. For this reason, when the principal ray angles of the imaging light GL are made equivalent between in the horizontal and vertical directions, the light flux width at the emission position of the projection optical system 30 is greater in the horizontal direction than in the vertical direction. This is undesirable, as this leads to an elongation in the lateral width of a product particularly in an HMD optical system of lateral development, to impart a great influence on an appearance of the product. For the above described reasons, in the first embodiment, the principal ray angle of the imaging light GL that is caused to exit, is inclined further inward in the vertical cross sectional direction, to make it possible to suppress elongation of the lateral widths of the respective optical systems, and to improve a tradeoff between widening of the angle and reducing the product in size.

In addition, provided that the principal ray angles differ between in the vertical cross section and in the horizontal cross section, the positions at which the luminous flux of the imaging light GL most converges also come to differ between in the vertical cross section and in the horizontal cross section. For example, the emission angle is oriented further inward from the image display device 80, then the convergence positions of the luminous fluxes come to be located closer to the image display device 80. In the first embodiment, by taking the above into consideration, the optimal disposition positions of the first diaphragm ST1 and the second diaphragm ST2 are determined to particularly suppress an occurrence of ghost light.

Figure 7:
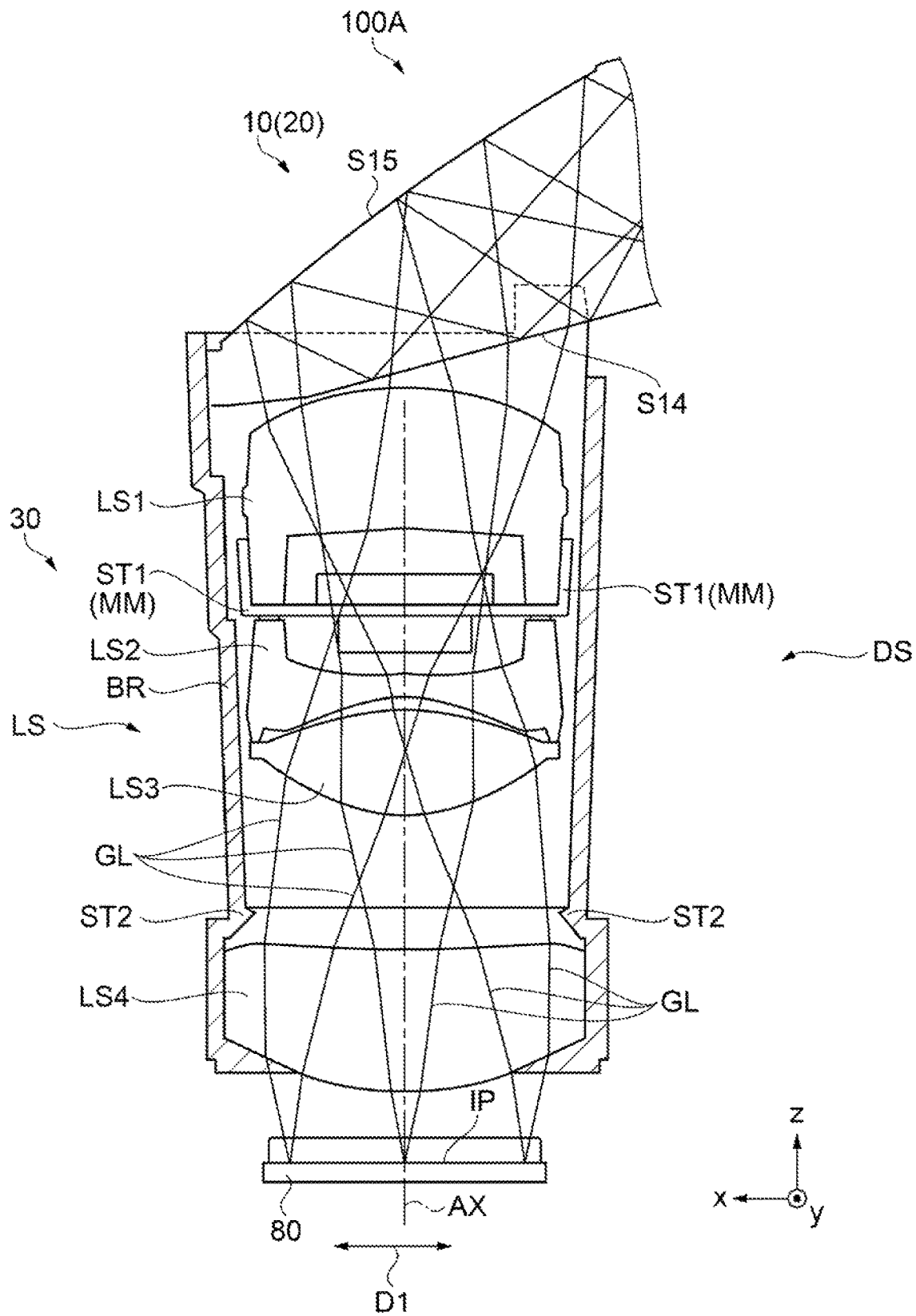
FIG. 7 is an explanatory plan cross-sectional view illustrating one configuration example of a projection optical system.

One configuration example of the projection optical system 30 will be described below in more detail with reference to FIG. 6 and the like. As illustrated in FIGS. 6 and 7, and as already described above, the projection lens LS in the projection optical system 30 includes the four lenses LS1 to LS4 in the order from the side farthest from the image display device 80 on the optical path, and these lenses are housed in the lens barrel BR being a single component, which is integrally formed. Note that the lens barrel BR is fabricated by resin molding, for example. Moreover, the two-stage structural diaphragm DS constituted by two diaphragms ST1 and ST2 is herein provided between the four lenses LS1 to LS4 of the projection optical system 30. In the illustrated example, in the two-stage structural diaphragm DS, the first diaphragm ST1 located downstream of the optical path is provided between the first lens LS1 and the second lens LS2, and the second diaphragm ST2 located upstream of the optical path is provided between the third lens LS3 and the fourth lens LS4. From a different point of view, lenses that constitute the projection optical system 30 are inserted between the first diaphragm ST1 and the second diaphragm ST2.

Further, in the illustrated example, in the two-stage structural diaphragm DS, the first diaphragm ST1 on one hand is constituted by a mounting member MM being a body separated from the lens barrel BR, and the second diaphragm ST2 on the other hand is integrally formed as a part of the lens barrel BR. In this case, the second diaphragm ST2 forms the most constricted portion in the lens barrel BR provided in a cylindrical form. Further, in one example herein, the first diaphragm ST1 is constituted by a black tape being the mounting member MM. Note that a structure of the first diaphragm ST1 will be described later with reference to FIG. 8 and the like.

In this case, as illustrated in FIG. 6, first, the second diaphragm ST2 is provided, in an inner surface of the lens barrel BR, at the optimal diaphragm position between the third lens LS3 and the fourth lens LS4. From a different point of view, the lens barrel BR forms a protrusion portion TP that is to be the second diaphragm ST2 between a positioning portion DT3 of the third lens LS3 and a positioning portion DT4 of the fourth lens LS4. Even in fabricating the lens barrel BR by injection molding, the protrusion portion TP specifies a reference position that is most inwardly flared.

Next, as illustrated in FIG. 7, the first diaphragm ST1 is provided, by causing the mounting member MM to be mounted on the first lens LS1, at the optimal diaphragm position between the first lens LS1 and the second lens LS2.

Figure 8:
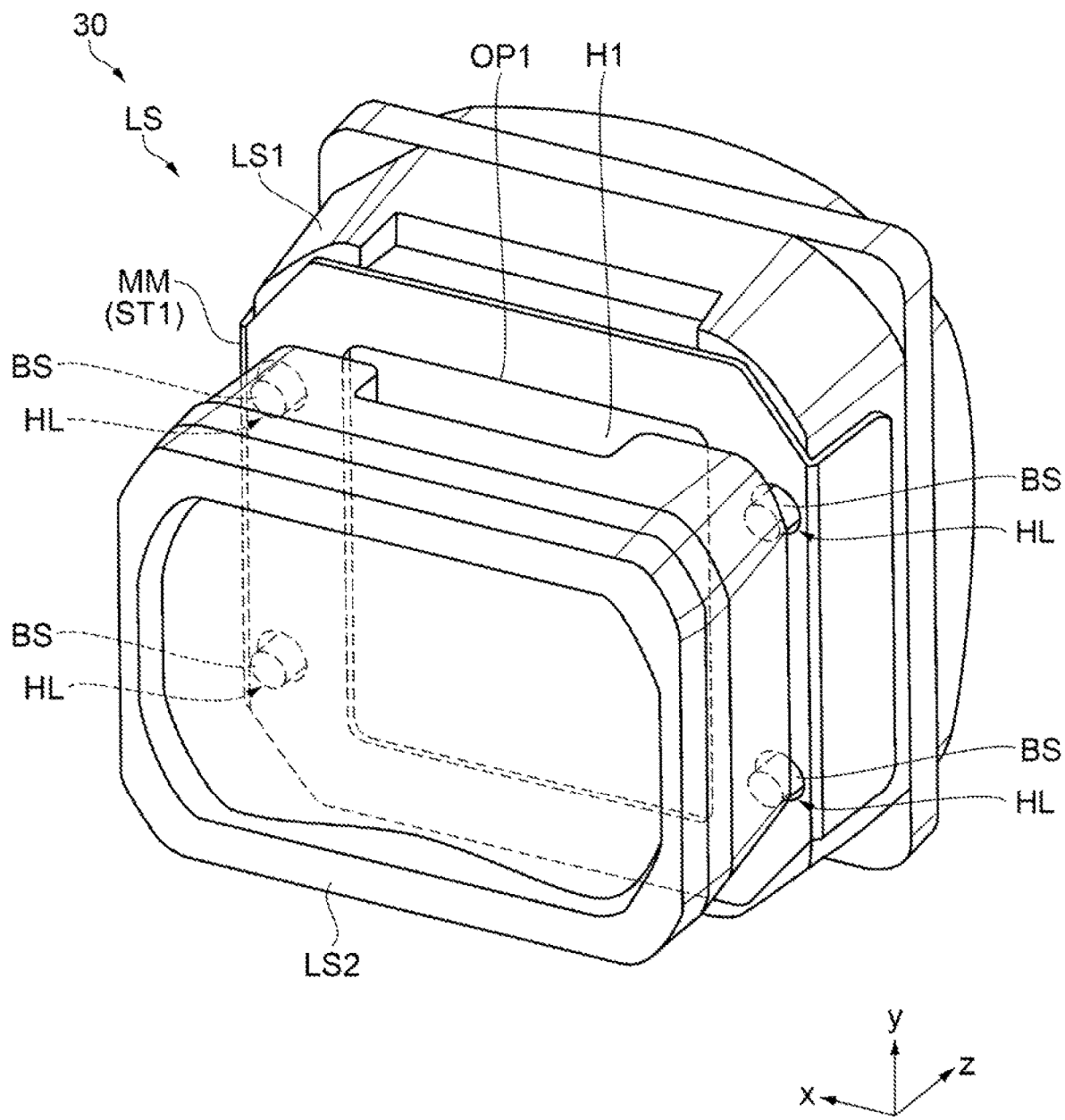
FIG. 8 is an explanatory perspective view illustrating one configuration example of a first diaphragm.
Figure 9:
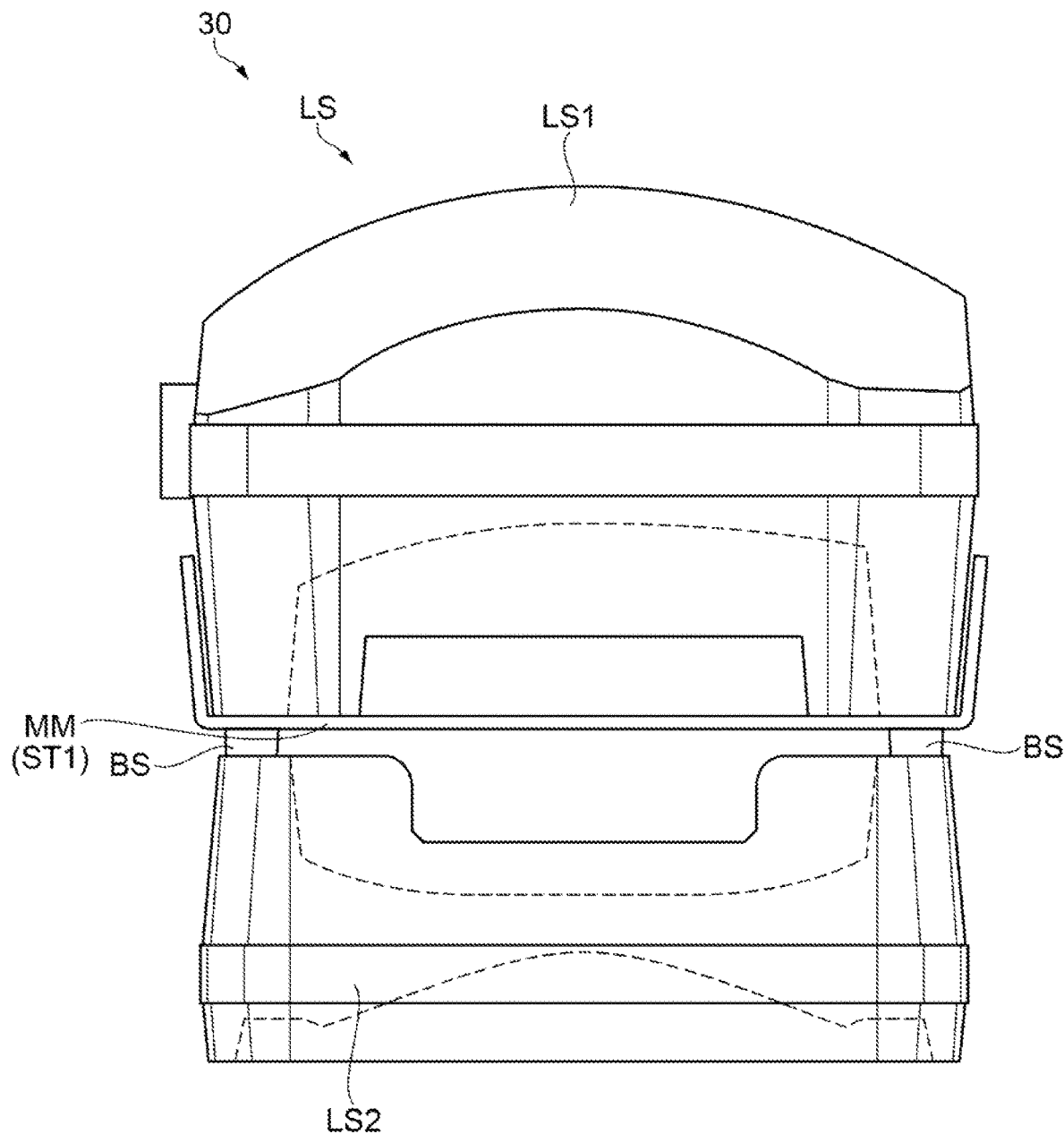
FIG. 9 is an explanatory plan view illustrating one configuration example of a first diaphragm.

The first diaphragm ST1 formed by the mounting member MM will be described below in more detail with reference to FIGS. 8 and 9. First, the mounting member MM that is to be the first diaphragm ST1 includes a black tape member in a sheet-like form, and includes four holes HL into which four bosses BS for positioning provided at four corners of the outside of an effective lens diameter in the first lens LS1 are to fit, in addition to an aperture H1 that defines a shape of a light transmissive region in an aperture portion OP1 of the first diaphragm ST1. That is, the holes HL are each fitted around the corresponding boss BS, thus the mounting member MM is accurately located relative to the first lens LS1, to form the first diaphragm ST1 including the aperture portion OP1. Further in this case, a tip end portion of the boss BS forms a contact surface with the second lens LS2, that is, the tip end portion of the boss BS forms a contact surface with other lenses or lens barrel, to cause the tip end portion to be used for the positioning the first lens LS1 in the optical axis direction. Moreover, as illustrated in a front view of FIG. 10 for example, the bosses BS and the holes HL at four locations are symmetrically provided at four corners. That is, the bosses BS and the holes HL are arranged, in a target positional relationship, with centering the optical axis AX illustrated in FIG. 3 and the like. Note that a deflection and the like of the first diaphragm ST1 in a sheet-like form are prevented from occurring by means of the presence of the bosses BS and the holes HL. In addition, an adhesive compound is formed beforehand on the mounting member MM in a sheet-like form, and is caused to adhere to the first lens LS1 when the mounting member MM is mounted to the first lens LS1. Note that in this case, the adhesive compound adheres to between the mounting member MM and the first lens LS1 located downstream of the optical path from the mounting member MM. That is, the adhesive compound is disposed on an opposite side from the image display device 80 in the mounting member MM. This helps avoid a reduction in a reflection preventing function for preventing a reflection of unnecessary light from the image display device 80 side due to the adhesive compound. That is, light is prevented from being reflected at the adhesive layer compared to a case of applying the adhesive compound in an opposed direction to that in the above, to thus suppress an occurrence of unexpected ghost.

Note that, as a measure other than the assembly structure due to the bosses BS and the holes HL described above, a structure may be employed in which a light-shielding sheet that is to be the first diaphragm ST1 can be affixed at its outer shape in a manner tightly fitted into or clamped at a recessed portion provided at a lens, a lens barrel (barrel), or the like. However, in this case, an assembly can be performed even when the fitting is conducted in a state of being somewhat misaligned during assembly, thus making it difficult to manage the assembly accuracy. In addition, a light-shielding sheet to be employed causes no issues as long as being a metal plate, a resin part, or the like being hardly deflected, while, when employing a sheet part or the like being relatively easily deflected, the assembly is possibly executed in a state where a deflection or the like is occurring thereinside. In the above description, a configuration is employed in which the boss BS, which is a protrusion provided at the lens LS1 or the like, is fitted around the hole HL of a sheet-like member that is to be the first diaphragm ST1, thus causing no deflection and preventing an occurrence of misalignment during assembly.

Due to the configuration described above, the assembly of the projection optical system 30 is performed such that the third lens LS3 is firstly assembled from an opposite side from an assembly side of the image display device 80 with reference to the positioning portion DT3 provided at the inner surface of the lens barrel BR, and the second lens LS2 is further assembled with reference to a positioning portion DT2. Subsequently, the first lens LS1, to which the mounting member MM has been mounted beforehand, is assembled from an opposite side from the assembly side of the image display device 80 onto the inner surface of the lens barrel BR with reference to a positioning portion DT1, and the fourth lens LS4 is lastly assembled from the assembly side of the image display device 80 with reference to the positioning portion DT4. In this way, the projection optical system 30 being a single unit is fabricated.

As described above, when the diaphragm to be constituted is provided at the lens barrel BR, the lens barrel BR, being a resin molded part, metal cutting part, or the like, allows the diaphragm to be provided at only one location due to a reason derived from the machining method. Thus, in the above description, one diaphragm is formed at the lens barrel BR, and the mounting member MM, which is a light-shielding sheet (black tape) disposed between the lenses to form another diaphragm. To describe more specific one example of the mounting member MM, the mounting member MM includes a light-shielding sheet constituted by a black tape or the like, that is, a black sheet member. In one example illustrated in FIG. 8 or FIG. 9, the mounting member MM has a configuration in which the mounting member MM is affixed to at least a part of the lens LS1, extending around the lens LS1. This improves an adhesion property to the lens LS1, making it possible to suppress an occurrence of light leakage and the like due to internal reflection at the vicinity of the lens LS1, and an influence on the imaging light and the like, caused by the light leakage.

Figure 10:
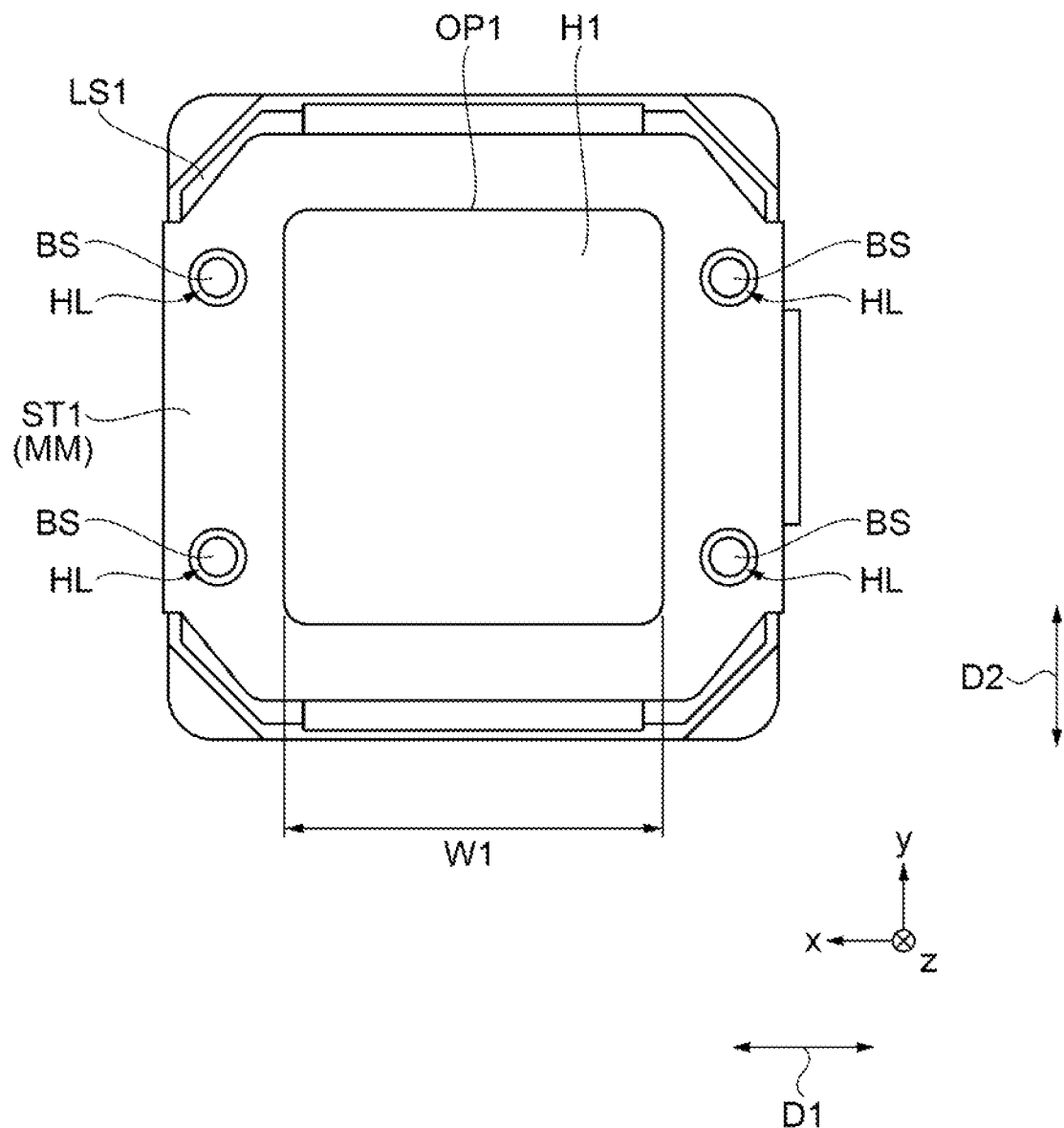
FIG. 10 is an explanatory front view illustrating one configuration example of a first diaphragm.
Figure 11:
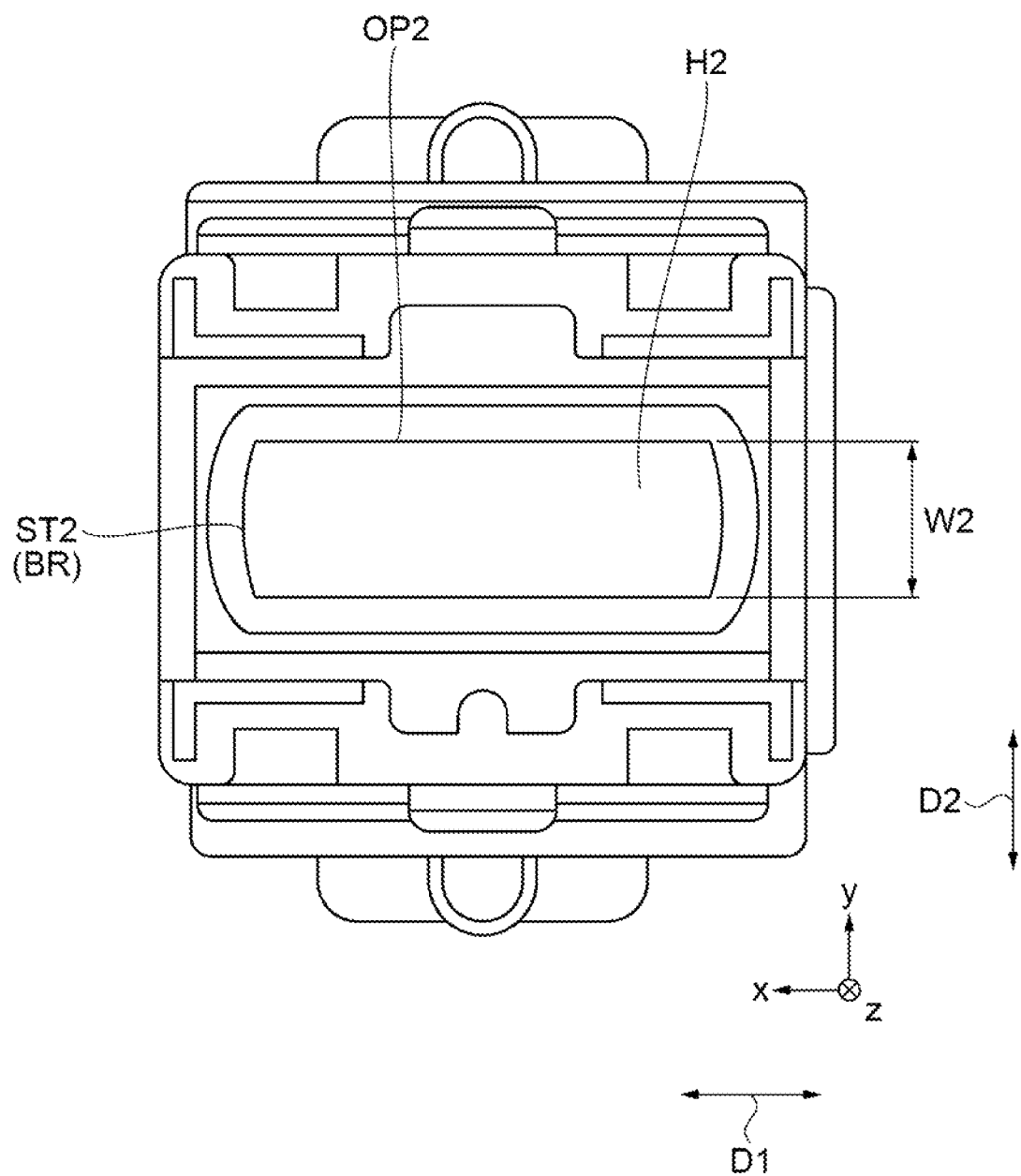
FIG. 11 is an explanatory front view illustrating one configuration example of a second diaphragm.

Note that in the projection optical system 30 described above, the luminous flux of imaging light GL is thinner at the second diaphragm ST2 than the luminous flux at the first diaphragm ST1. For example, as illustrated in FIGS. 10 and 11, a second direction aperture width W2, which is an aperture width in the second direction D2 of a second aperture portion OP2 forming an aperture H2 at the second diaphragm ST2 is narrower than a first direction aperture width W1, which is an aperture width in the first direction D1 of the first aperture portion OP1 forming the aperture H1 at the first diaphragm ST1. For example, a configuration may be employed in which the first direction aperture width W1 is approximately 8.5 mm, while the second direction aperture width W2 is approximately 4.25 mm. Further, as illustrated in FIG. 11, the aperture width in the first direction D1 of the shape of the aperture H2 is greater than the aperture width in the second direction D2 (that is, the second direction aperture width W2).

As described above, the virtual image display apparatus 100 according to the first embodiment includes the image display device 80 being an imaging element configured to display an image the projection optical system 30 configured to project imaging light GL from the image display device 80, and the two-stage structural diaphragm DS including the first diaphragm ST1 forming the first aperture portion OP1 in the projection optical system 30, and the second diaphragm ST2 forming the second aperture portion OP2 in the projection optical system 30, in which inclinations relative to the image plane IP of the principal ray PRp of the imaging light GL emitted from a peripheral portion of the image plane IP of the image display device 80 differ between in the first direction D1 and in the second direction D2 perpendicular to the first direction D1 among in-plane directions of the image plane IP, in which the first diaphragm ST1 and the second diaphragm ST2 in the two-stage structural diaphragm DS are provided at different positions corresponding to differences between the inclinations of the principal ray PRp in the first direction D1 and in the second direction D2.

In the virtual image display apparatus 100 described above, the first diaphragm ST1 and the second diaphragm ST2 in the two-stage structural diaphragm DS are provided at different positions corresponding to differences between the inclinations of the principal ray PRp in the first direction D1 and the second direction D2 among in-plane directions of the image plane IP of the image display device 80 being an imaging element, to thus suitably adjust the imaging light GL. More specifically, in the first embodiment, regarding the inclinations of the principal ray PRp at a peripheral portion of the image display device 80, the inclination in the second direction D2 is greater than the inclination in the first direction D1. In correspondence with the above, in the two-stage structural diaphragm DS, the first diaphragm ST1 is a diaphragm for the first direction D1, and the second diaphragm ST2 is a diaphragm for the second direction D2. This suppresses an occurrence of ghost, and, for example, enables projected image display with superior quality and wide field angle, and offers projected image with high image quality, and further makes it possible to miniaturize the optical system, and, by extension, to reduce the size of the whole apparatus.

Second Embodiment

One example of a virtual image display apparatus according to a second embodiment will be described below with reference to FIG. 12.

The virtual image display apparatus according to the second embodiment is a modification of the virtual image display apparatus exemplified in the first embodiment, and is similar to the case in the first embodiment except for the direction in which the imaging light GL is light-guided. Thus, description related to the whole of the virtual image display apparatus will not be given.

Figure 12:
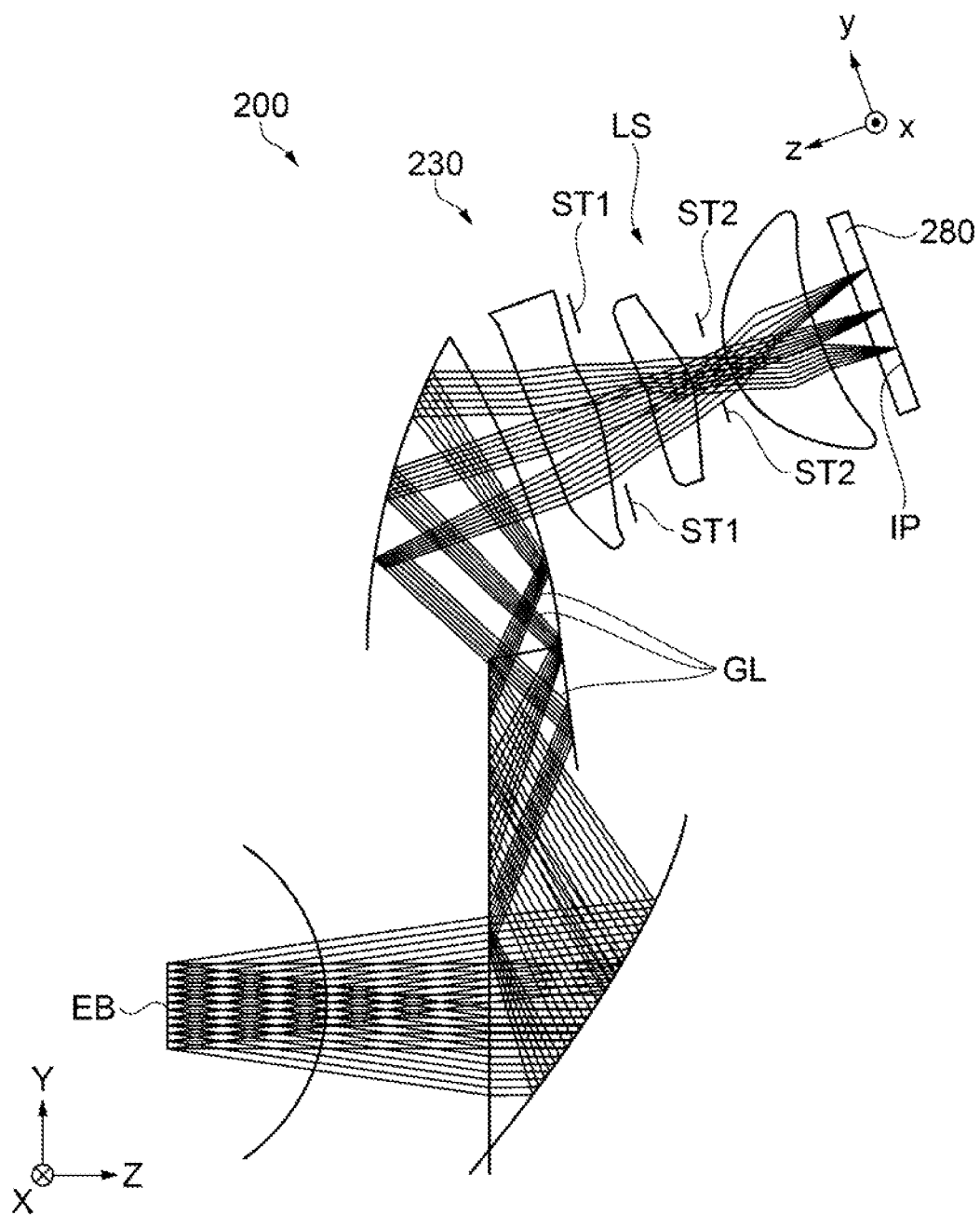
FIG. 12 is an explanatory light path view illustrating one example of a virtual image display apparatus according to a second embodiment.

FIG. 12 is an explanatory light path view illustrating one configuration example of a virtual image display apparatus 200 according to the second embodiment, which additionally illustrates a conceptual configuration, and is a view corresponding to FIG. 3. In an example of FIG. 3, the imaging light GL is light-guided in the right-left direction along the horizontal direction in which the eyes are aligned, while in the second embodiment, the imaging light GL is light-guided in the vertical direction along a direction perpendicular to the horizontal direction. In this case as well, the imaging light GL emitted from the image plane IP of an image display device 280 is inclined, and the first diaphragm ST1 and the second diaphragm ST2 that constitute the two-stage structural diaphragm DS are arranged, relative to a projection optical system 230, at different positions on an optical path in accordance with the inclination of imaging light GL emitted from the image plane IP. This suppresses an occurrence of ghost, and, for example, enables projected image display with superior quality and wide field angle, and offers projected image with high image quality, and further makes it possible to miniaturize the optical system, and, by extension, to reduce the size of the whole apparatus.

Third Embodiment

One example of a virtual image display apparatus according to a third embodiment will be described below with reference to FIG. 13 and the like.

The virtual image display apparatus according to the third embodiment is a modification of the virtual image display apparatus exemplified in the first embodiment, and is similar to the case in the first embodiment except for the configuration of the optical system constituting the first display device and the second display device. Thus, description related to the whole of the virtual image display apparatus will not be given. Further, since the first display device and the second display device have right-left symmetric and equivalent structures, only the first display device will be described, and a description of the second display device will not be given. In addition, components among those in the optical system, denoted by the same reference signs as in the first embodiment, to which additional descriptions are not given, are the same as in the first embodiment.

Figure 13:
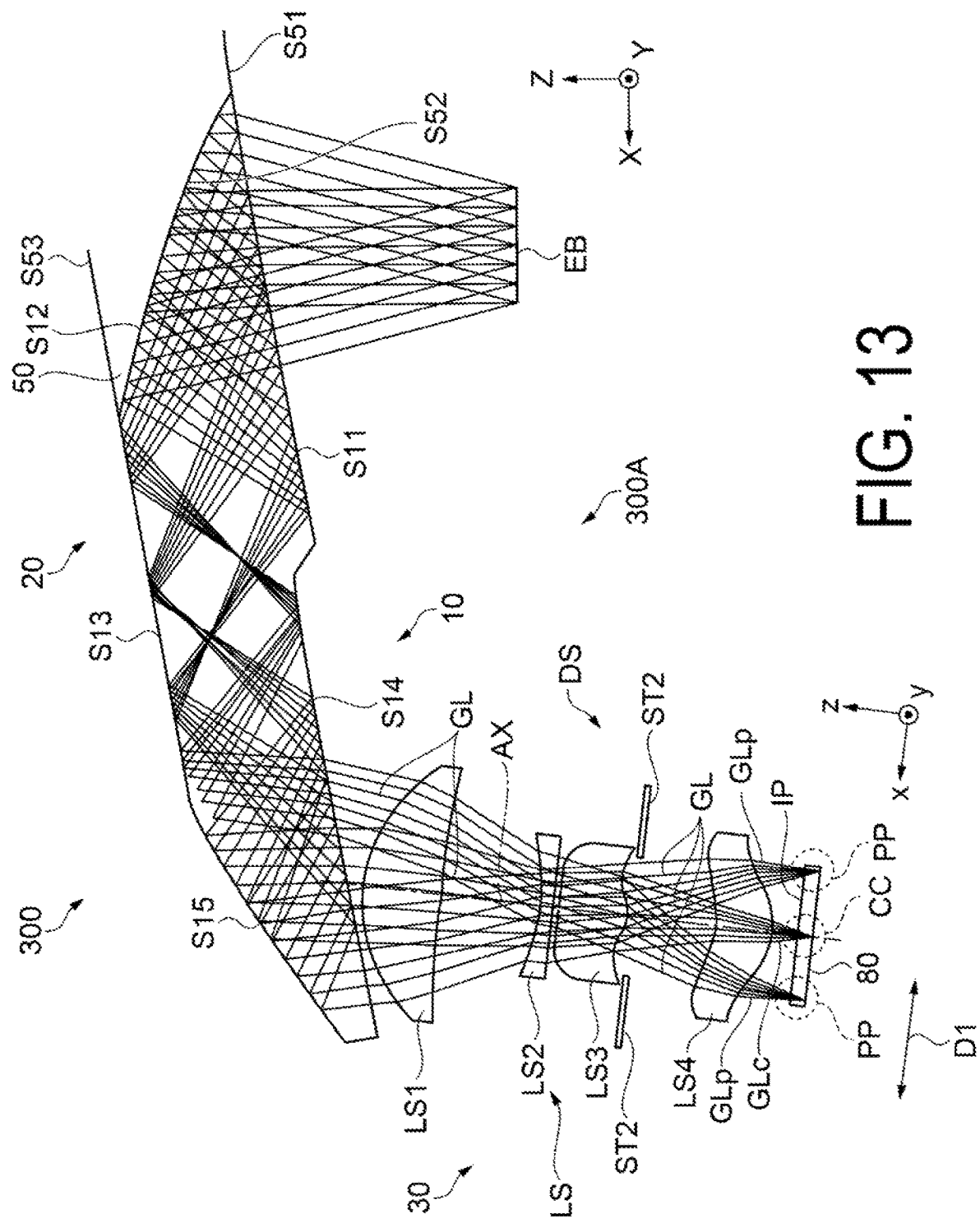
FIG. 13 is a plan cross-sectional view illustrating an optical system and an optical path of imaging light in one example of a virtual image display apparatus according to a third embodiment.
Figure 14:
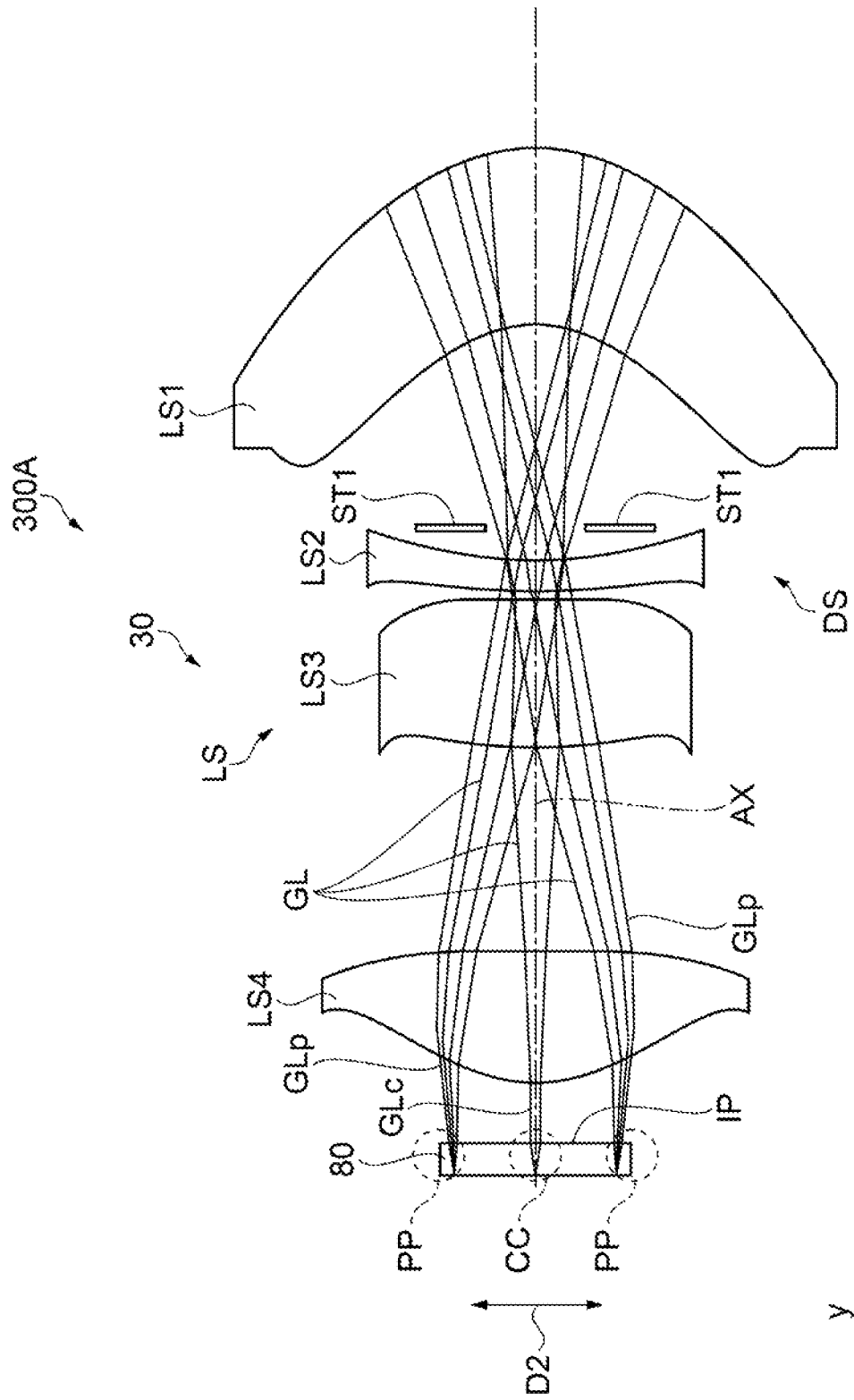
FIG. 14 is a side cross-sectional view illustrating an optical system and an optical path of imaging light in a virtual image display apparatus.
Figure 15:
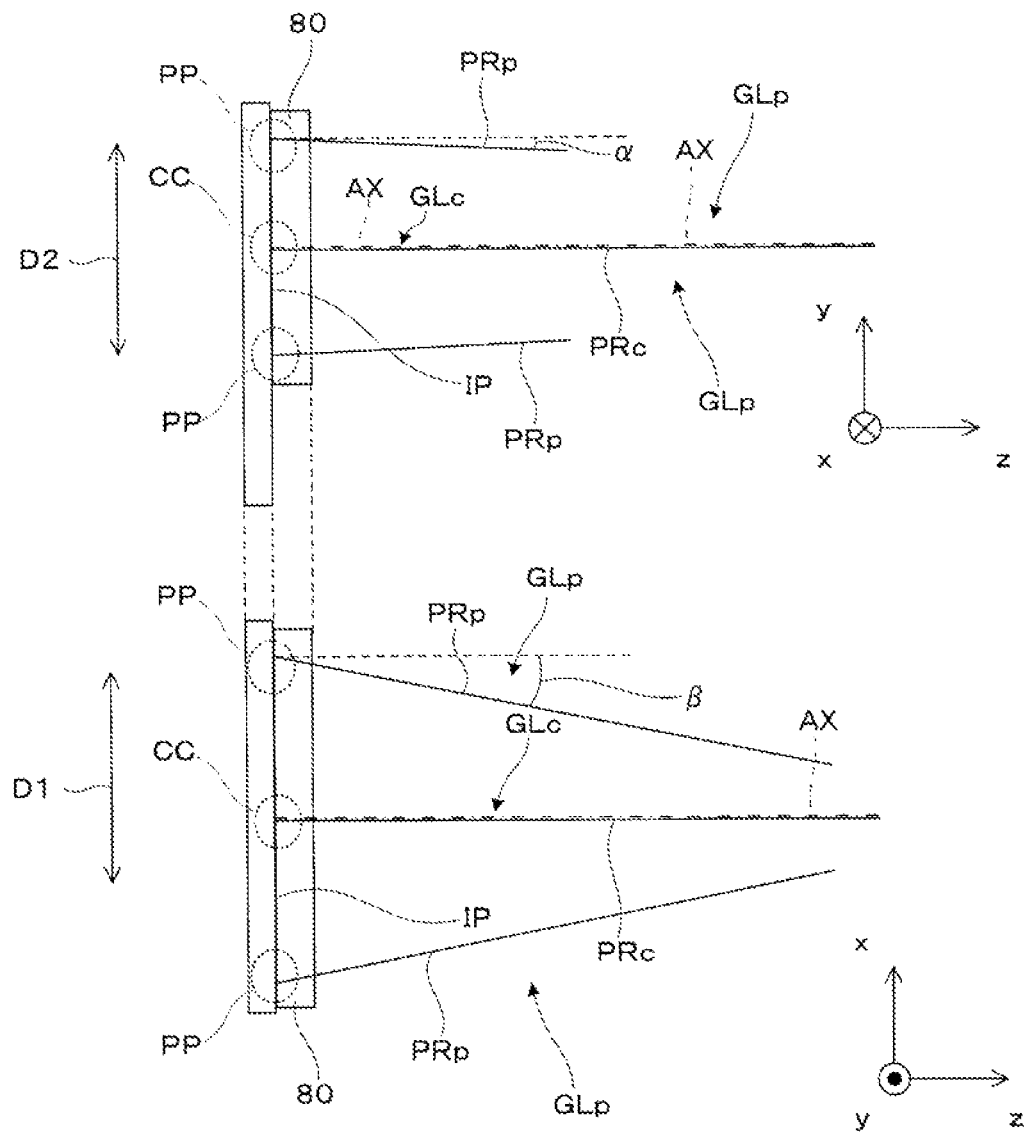
FIG. 15 is an explanatory view conceptually illustrating inclinations of a principal ray in imaging light.

FIG. 13 is an explanatory plan cross-sectional view illustrating one configuration example of a virtual image display apparatus 300 according to the third embodiment, which illustrates a first display device 300A for the left eye in the virtual image display apparatus 300. FIG. 14 is a side cross-sectional view of the first display device 300A. FIG. 15 is an explanatory view conceptually illustrating an inclination of a principal ray in imaging light, which is a view corresponding to FIG. 5.

As illustrated in FIGS. 13 to 15, in the third embodiment, in the two-stage structural diaphragm DS, the first diaphragm ST1 relatively located downstream of the optical path and the second diaphragm ST2 relatively located upstream of the optical path function differently from the case in the first embodiment. To put it briefly, as illustrated in FIG. 14, the first diaphragm ST1 disposed downstream of the optical path, that is, at a position relatively farther from the image display device 80, is a diaphragm in the vertical direction. On the other hand, as illustrated in FIG. 13, the second diaphragm ST2 disposed upstream of the optical path, that is, at a position relatively closer to the image display device 80, is a diaphragm in the horizontal direction. This is because, in the virtual image display apparatus 300 according to the third embodiment, as illustrated in FIG. 15, regarding the inclinations of the principal ray PRp, a configuration is employed in which the inclination in the second direction D2 is greater than the inclination in the first direction D1, which corresponds to the configuration in which the inclination angle α is greater than the inclination angle β in FIG. 15. In the third embodiment as well, the two-stage structural diaphragm DS includes the first and second diaphragms ST1 and ST2 in a positioning relationship described above, thus suitably adjusting light to suppress an occurrence of ghost.

As described above, in the third embodiment as well, as in the first embodiment, in the two-stage structural diaphragm DS including the first diaphragm ST1 forming the first aperture portion in the projection optical system 30 and the second diaphragm ST2 forming the second aperture in the projection optical system 30, the second diaphragm ST2 is disposed, on the optical path, at a position closer to the image display device 80 than the first diaphragm ST1 is, where the first diaphragm ST1 and the second diaphragm ST2 are diaphragms for different directions. In addition to the above, in the third embodiment, contrary to the first embodiment, regarding the inclinations of the principal ray PRp at the peripheral portion of the image display device 80, the inclination in the second direction D2 is smaller than the inclination in the first direction D1. In correspondence to the above, in the two-stage structural diaphragm DS, the first diaphragm ST1 is a diaphragm for the second direction D2, and the second diaphragm ST2 is a diaphragm for the first direction D1. This suppresses an occurrence of ghost, and, for example, enables projected image display with superior quality and wide field angle, and offers projected image with high image quality, and further makes it possible to miniaturize the optical system, and, by extension, to reduce the size of the whole apparatus.

Other Matters

The present disclosure is described above based on the embodiments. However, the present disclosure is not limited to the above-described embodiments, and can be embodied in various aspects without departing from the spirit and scope of the present disclosure.

First, among the above descriptions, in the first embodiment, for example, the second diaphragm ST2 is formed by the lens barrel BR, however, for example, the lens barrel BR needs to be an integral part also including a diaphragm shape, and thus a thickness of a part of the diaphragm portion needs to be at least not less than 0.7 mm, in order to achieve cost reduction in particular. Thus, for example, the distance between lenses (edge interval) in which the second diaphragm ST2 is disposed may be ensured for at least 1 mm or more.

In addition to the above, the first diaphragm ST1 may be, for example, a metal plate, paper, or a sheet member of plastic material, or may be a plastic molded member. The first diaphragm ST1 may further be a black coated metal plate. As a method for fixing the first diaphragm ST1, the first diaphragm ST1 may be disposed in a manner clamped between lenses in addition to a method in which the first diaphragm ST1 is affixed to a lens, and a snap-fit structure (hook structure) between a lens and a plastic molded member or metal plate may also be used. A thin member such as a tape may be applied to the first diaphragm ST1, to thus suppress reflection, scattering, and the like. That is, the first diaphragm ST1 includes a thin-walled part to make it possible to avoid a situation in which additional ghost light occurs by internal reflection in conjunction with the provision of a thick-walled side portion, thus effectively cutting ghost light inside a lens barrel, at a lens side portion, or the like.

Figure 16:
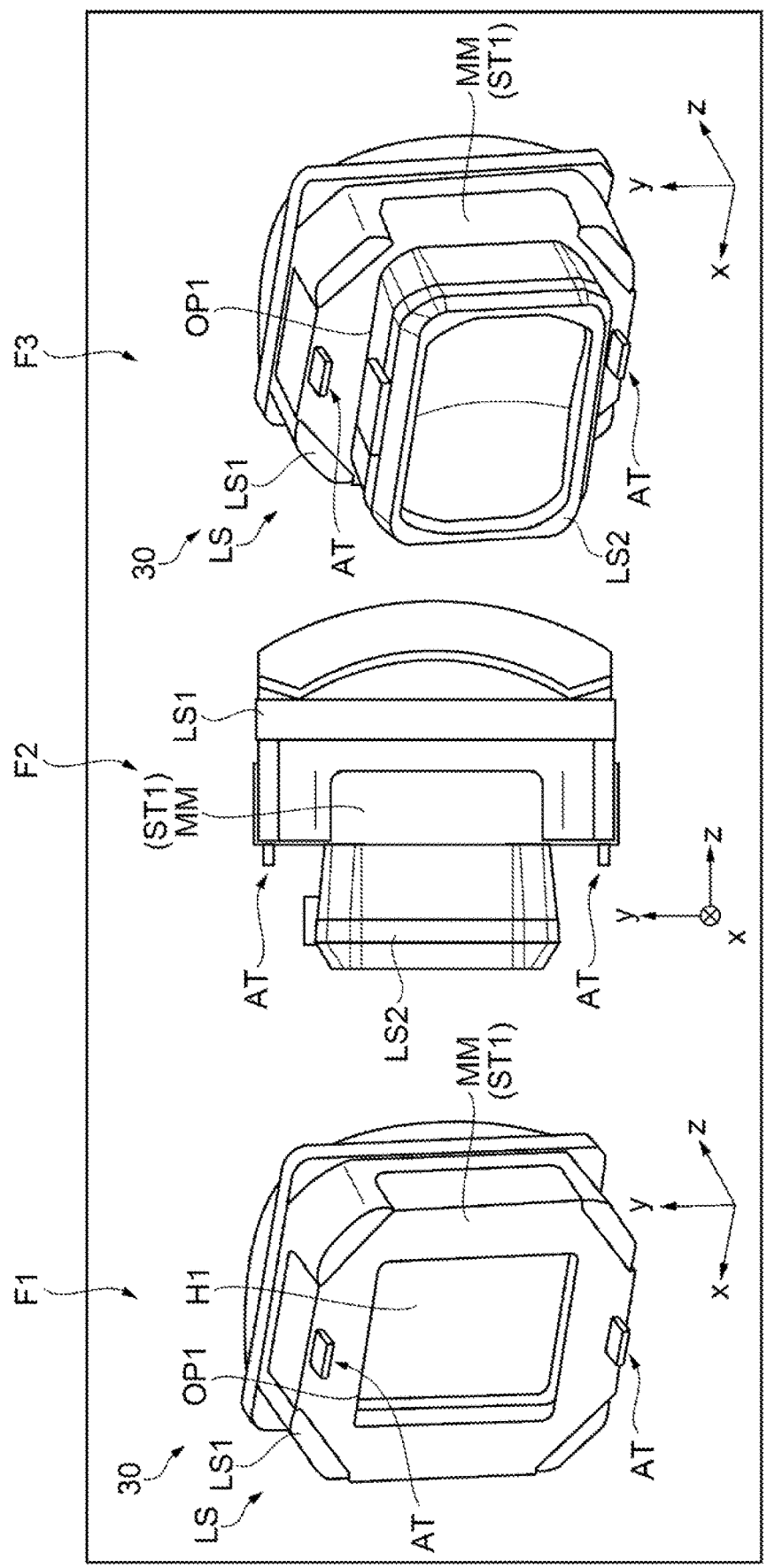
FIG. 16 is an explanatory view illustrating one modification related to a mounting structure of a first diaphragm.

Further, regarding a structure for mounting the first diaphragm ST1, as illustrated, for example, in a perspective view F1, a side face view F2, and a perspective view F3 in FIG. 16, the first diaphragm ST1 may be disposed and fixed in a manner interposed between the lens LS1 and the lens LS2. More specifically, first, as illustrated in the perspective view F1, the first diaphragm ST1 is brought to a state of being mounted to the lens LS1 by a mounting positioning portion AT provided by a protrusion portion and a hole corresponding to the protruding portion in the lens LS1 and the first diaphragm ST1.

Subsequently, as illustrated in the side face view F2 and the perspective view F3, the lens LS2 is assembled to the first diaphragm ST1 with the first diaphragm ST1, then the first diaphragm ST1 can eventually be disposed in a manner interposed between the lens LS1 and the lens LS2. Note that, in the above description, a portion of a member that clamps the first diaphragm ST1 may be a contact surface of a lens barrel in place of the lens LS1 or the like.

In the above cases, the position of the first diaphragm ST1 is determined in a manner clamping the first diaphragm ST1 without using an adhesive compound, to thus suppress the assembly cost, eliminating a bonding process, compared to a case of using a metal plate or a resin part.

Further, the aperture of each of the diaphragms ST1 and ST2 may have a right-left asymmetric shape. For example, as exemplified in a front view G1 and a perspective view G2 of FIG. 17, the aperture H1 of the first diaphragm ST1 may have a trapezoidal shape or the like. In this case, in order to prevent a mistake in the assembly direction during assembly, as exemplified in FIG. 17, for example, only the hole diameter of the hole for positioning at the lower right location may differ from the other hole diameters, or the holes are arranged in a right-left asymmetrical manner, among the four bosses BS for positioning and the corresponding four holes HL.

Figure 17:
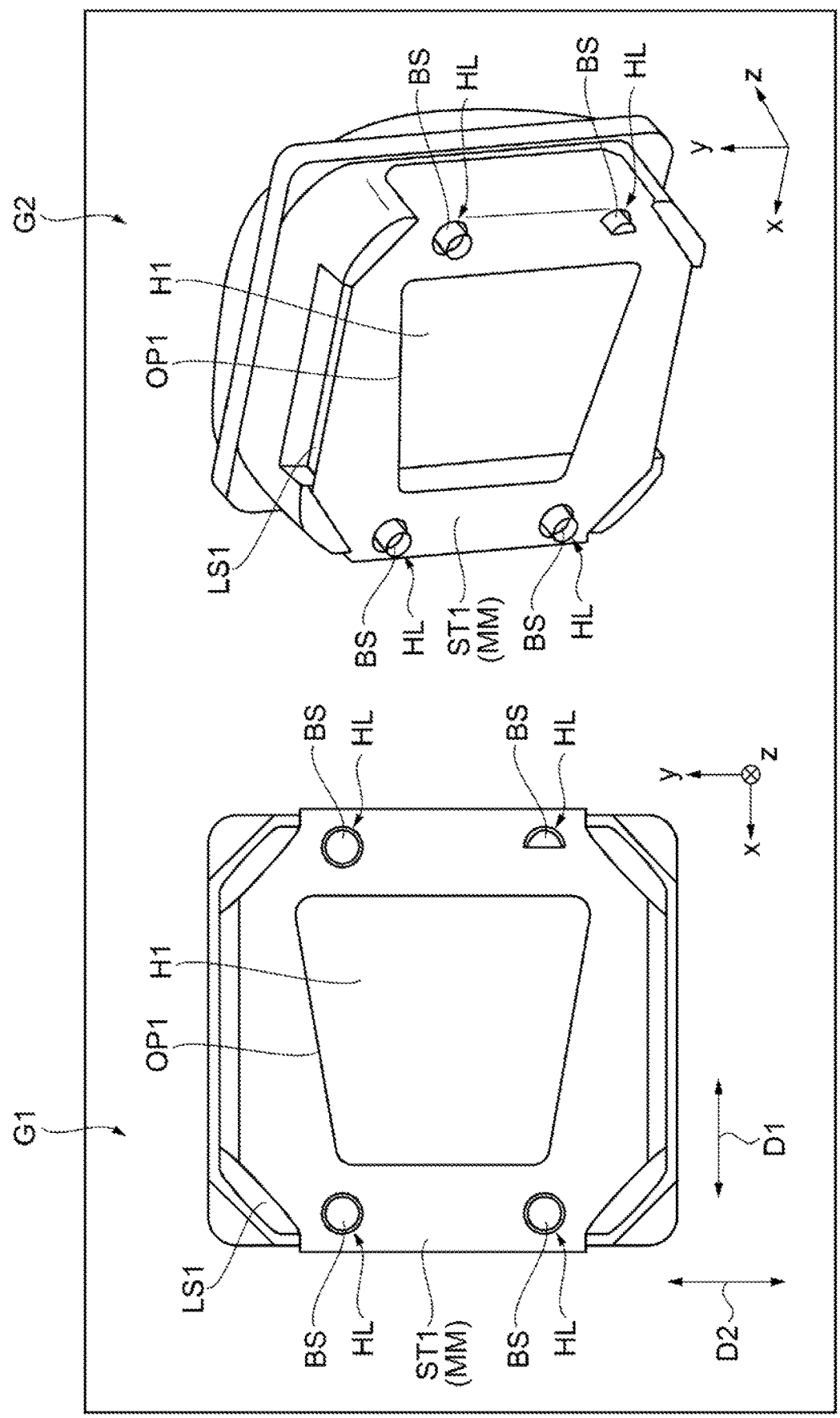
FIG. 17 is an explanatory view illustrating another modification related to a mounting structure of a first diaphragm.

As the exemplification in FIG. 17, the aperture H1 of the first diaphragm ST1 has an up-down or right-left asymmetrical shape, and regarding dimensions of the bosses for positioning, at least one boss BS differs in sizes or shapes from the other bosses BS, and the corresponding hole HL differs in size from the other holes as well, thus making it possible to address cases when the telecentric angles for the emission components from the image display device 80 are up-down or right-left asymmetric, for example. That is, when the whole shape of the luminous flux on the light source side is asymmetric, the shape of the aperture H1 is also caused to be up-down or right-left asymmetric as described above, thus making it possible to more efficiently cut ghost light. Further, in this case, to avoid mis-assembly during assembly, the boss and the corresponding hole are shaped such that at least one boss or hole is changed in shape from the other bosses or holes to avoid a symmetrical rotation.

Further, in the above description, the bosses BS for positioning and the corresponding holes HL are symmetrically provided at four corners such that at least one pair of the bosses BS for positioning and the corresponding holes HL are arranged at symmetrical positions relative to the optical axis center, to render a configuration enabling an assembly without causing deflection in the horizontal and vertical directions during assembly, where ideally, the bosses BS for positioning and the corresponding holes HL are symmetrically provided at four corners as exemplified in FIG. 10 and the like. However, without being limited to the above, at least one pair of the bosses for positioning are arranged at symmetrical positions relative to the optical axis center, thus making it possible to expect maintaining assembly accuracy to some degrees.

Further, in the above description, as one example, the boss BS is provided at the first lens LS1 and the tip end portion of the boss BS is brought into contact with the second lens LS2, to thus perform positioning of the first lens LS1 in the optical axis direction, however, various are conceivable for the locations at which the boss BS is provided, where the boss BS may also be provided at a lens or the lens barrel BR of the projection optical system 30 in addition to the first lens LS1.

Further, the boss BS for positioning may be provided at both ends in the longitudinal direction among the shapes of the lens LS1 or the like provided with the boss BS. This is because, for example, when the lens has a vertically elongated shape, the boss BS is provided at at least one location of each of the upper and lower locations of the lens, then a longer spacing between the bosses BS achieves higher assembly accuracy with respect to a rotation that occurs when a sheet is affixed.

Moreover, the above may be constituted by a plurality of lens barrels. For example, a configuration may also be employed in which the three lenses LS1 to LS3 are fixed at the first lens barrel, the lens LS4 is fixed at the second lens barrel, and the first lens barrel and the second lens barrel are jointed to form the projection lens LS. In this case, two diaphragm positions can be ensured at the lens barrel.

Further, as the image display device 80, in addition to the above described devices, various types of image display devices including an HIPS being a transmissive liquid crystal display device can be used. For example, a configuration using a reflective liquid crystal display device can also be employed, or a digital micro-mirror device and the like can also be used in place of the projected image display element including a liquid crystal display device and the like.

Further, an occurrence of ghost light or the like may further be suppressed by appropriately applying AR coating on lens surfaces of the respective lenses.

Further, the technology of the present disclosure may be employed in a virtual image display apparatus of a so-called closed-type (which is not a see-through type) configured to allow only image light to be visually recognized. Additionally, the technology of the present disclosure may also be employed in a device that allows an observer to visually recognize or observe external scene images in a see-through manner, and may be applied to a so-called video see-through product constituted by a display and an imaging device.

Further, the technology of the present disclosure is applicable to a hand held display of a binocular type and the like.

Further, in the above description, an optical function surface such as a diffraction element of a volume hologram and the like may be provided, in place of the semi-reflective and semi-transmissive film configured to transmit a part of imaging light and reflects another part, at a location at which the semi-reflective and semi-transmissive film is provided, to exert a function equivalent to that of the semi-reflective and semi-transmissive film.

As described above, a virtual image display apparatus according to an aspect of the present disclosure includes an imaging element configured to display an image, a projection optical system configured to project an image from the imaging element, and a two-stage structural diaphragm including a first diaphragm forming a first aperture portion in the projection optical system, and a second diaphragm forming a second aperture portion in the projection optical system, in which the first diaphragm and the second diaphragm in the two-stage structural diaphragm are provided at different positions corresponding to inclinations of a principal ray of imaging light emitted from a peripheral portion of an image plane of the imaging element.

In the virtual image display apparatus described above, in the two-stage structural diaphragm, the first diaphragm and the second diaphragm are provided at different positions corresponding to the inclinations of a principal ray of imaging light emitted from a peripheral portion of an image plane of the imaging element, to thus enable a suitable adjustment of the light. This suppresses an occurrence of ghost, and, for example, enables projected image display with superior quality and wide field angle, and offers projected image with high image quality, and further makes it possible to miniaturize the optical system, and, by extension, to reduce the size of the whole apparatus.

In a specific aspect of the present disclosure, the inclinations of the principal ray relative to the image plane differ between in a first direction and in a second direction perpendicular to the first direction among in-plane directions of the image plane. In this case, the light can be suitably adjusted in accordance with the difference between the inclinations of the principal rays in the first direction and in the second direction among the in-plane directions of the image plane of the imaging element.

In another aspect of the present disclosure, a surface of an eyebox indicating a range in which a virtual image can be visually recognized by an observer is larger in a horizontal direction in which eyes are aligned during observation than in a vertical direction perpendicular to the horizontal direction, in which the first direction corresponds to the horizontal direction, and the second direction corresponds to the vertical direction. In this case, in a binocular vision for example, a configuration may be employed in which an eye width adjustment is unnecessary.

In still another aspect of the present disclosure, regarding the inclinations of the principal ray at a peripheral portion of the imaging element, the inclination in the second direction is greater than the inclination in the first direction, and in the two-stage structural diaphragm, the second diaphragm is disposed, on an optical path, at a position closer to the imaging element than the first diaphragm is, in which the first diaphragm is a diaphragm for the first direction, and the second diaphragm is a diaphragm for the second direction. In this case, a suited diaphragm can be provided in accordance with the difference between the inclinations.

In still another aspect of the present disclosure, an aperture width of the second aperture portion in the second direction is smaller than an aperture width of the first aperture in the first direction. In this case, a diaphragm is enabled in accordance with a luminous flux.

In still another aspect of the present disclosure, regarding the inclinations of the principal ray at a peripheral portion of the imaging element, the inclination in the second direction is smaller than the inclination in the first direction, and in the two-stage structural diaphragm, the second diaphragm is disposed, on an optical path, at a position closer to the imaging element than the first diaphragm is, in which the first diaphragm is a diaphragm for the first direction, and the second diaphragm is a diaphragm for the second direction. In this case, a suited diaphragm can be provided in accordance with the difference between the inclinations.

In still another aspect of the present disclosure, the projection optical system forms an intermediate image, and constitutes an asymmetric optical system. In this case, a high quality image can be formed while maintaining an optical path length suitable for an HMD.

In still another aspect of the present disclosure, the projection optical system includes at least one lens disposed between a diaphragm position of the first diaphragm and a diaphragm position of the second diaphragm. In this case, the diaphragms can be disposed at the optimal diaphragm position.

In still another aspect of the present disclosure, in the two-stage structural diaphragm, one of the first diaphragm and the second diaphragm is integrally formed as a part of a lens barrel of the projection optical system, while the other of the first diaphragm and the second diaphragm includes a mounting member separate from the lens barrel. In this case, a two-stage structural diaphragm can be achieved with a simple configuration.

In still another aspect of the present disclosure, the mounting member includes a black sheet member. In this case, for example, a black sheet member constituted by a black tape or the like can be used to block light.

In still another aspect of the present disclosure, further included is a light-guiding member including a transmissive reflective surface covering a front of eyes when worn by an observer. In this case, a see-through can be achieved.

As described above, a virtual image display apparatus according to another aspect of the present disclosure includes, an imaging element configured to display an image, a projection optical system configured to project an image from the imaging element, and a two-stage structural diaphragm including a first diaphragm forming a first aperture portion in the projection optical system, and a second diaphragm forming a second aperture portion in the projection optical system, in which in the two-stage structural diaphragm, the second diaphragm is disposed, on an optical path, at a position closer to the imaging element than the first diaphragm is, in which the first diaphragm and the second diaphragm are diaphragms for different directions.

In the virtual image display apparatus described above, in the two-dimensional structure diaphragm, the second diaphragm is disposed, on an optical path, at a position closer to the imaging element than the first diaphragm is, and the first diaphragm and the second diaphragm are diaphragms for different directions, to thus enable a suitable adjustment of the light. This suppresses an occurrence of ghost, and, for example, enables projected image display with superior quality and wide field angle, and offers projected image with high image quality, and further makes it possible to miniaturize the optical system, and, by extension, to reduce the size of the whole apparatus.

In a specific aspect of the present disclosure, the projection optical system includes at least one lens disposed between a diaphragm position of the first diaphragm and a diaphragm position of the second diaphragm.

In another aspect of the present disclosure, in the two-stage structural diaphragm, one of the first diaphragm and the second diaphragm is integrally formed as a part of a lens barrel of the projection optical system, while the other includes a mounting member separate from the lens barrel. In this case, a two-stage structural diaphragm can be achieved with a simple configuration.

In still another aspect of the present disclosure, the mounting member includes a black sheet member. In this case, for example, a black sheet member constituted by a black tape or the like can be used to block light.

In still another aspect of the present disclosure, a black sheet member is affixed to at least a part of a lens constituting the projection optical system, extending around the lens. In this case, an adhesion property to the lens constituting the projection optical system is improved, suppressing an occurrence of light leakage and the like due to internal reflection in the vicinity of the lens, and an influence on the imaging light and the like caused by the light leakage.

In still another aspect of the present disclosure, the mounting member includes a plurality of holes corresponding to a plurality of bosses for positioning provided in the projection optical system or at a lens barrel. In this case, an occurrence of deflection and misalignment can be suppressed during assembly of the mounting member.

In still another aspect of the present disclosure, bosses for positioning are symmetrically disposed in the projection optical system. In this case, an assembly accuracy can be enhanced.

In still another aspect of the present disclosure, the bosses for positioning abut against the projection optical system or the lens barrel for positioning in an optical axis direction. In this case, a positioning with high accuracy is possible.

In still another aspect of the present disclosure, included are the bosses for positioning and a plurality of holes corresponding to the bosses include bosses and holes having shapes different from the other bosses and holes. In this case, a mis-assembly can be avoided.

What is claimed is:

1. A virtual image display apparatus comprising:
    an imaging element configured to display an image;
    a projection optical system configured to project an image from the imaging element; and
    a two-stage structural diaphragm including a first diaphragm forming a first aperture portion in the projection optical system, and a second diaphragm forming a second aperture portion in the projection optical system, wherein
    the first diaphragm and the second diaphragm in the two-stage structural diaphragm are provided at different positions corresponding to inclinations of a principal ray of imaging light emitted from a peripheral portion of an image plane of the imaging element, and
    the inclinations of the principal ray relative to the image plane differ between in a first direction and in the second direction perpendicular to the first direction among in-plane directions of the image plane.

2. The virtual image display apparatus according to claim 1, wherein
    a surface of an eyebox indicating a range in which a virtual image can be visually recognized by an observer is larger in a horizontal direction in which eyes are aligned during observation than in a vertical direction perpendicular to the horizontal direction, and
    the first direction corresponds to the horizontal direction, and the second direction corresponds to the vertical direction.

3. The virtual image display apparatus according to claim 1, wherein
    regarding the inclinations of the principal ray at a peripheral portion of the imaging element,
    an inclination in the second direction is greater than an inclination in the first direction, and in the two-stage structural diaphragm, the second diaphragm is disposed, on an optical path, at a position closer to the imaging element than the first diaphragm is, wherein the first diaphragm is a diaphragm for the first direction, and the second diaphragm is a diaphragm for the second direction.

4. The virtual image display apparatus according to claim 3, wherein
an aperture width of the second aperture portion in the second direction is smaller than an aperture width of the first aperture in the first direction.

5. The virtual image display apparatus according to claim 1, wherein
regarding the inclinations of the principal ray at a peripheral portion of the imaging element, an inclination in the second direction is smaller than an inclination in the first direction, and
in the two-stage structural diaphragm, the second diaphragm is disposed, on an optical path, at a position closer to the imaging element than the first diaphragm is, wherein
the first diaphragm is a diaphragm for the first direction, and the second diaphragm is a diaphragm for the second direction.

6. The virtual image display apparatus according to claim 1, wherein
the projection optical system forms an intermediate image, and constitutes an asymmetric optical system.

7. The virtual image display apparatus according to claim 1, wherein
the projection optical system includes at least one lens disposed between a diaphragm position of the first diaphragm and a diaphragm position of the second diaphragm.

8. The virtual image display apparatus according to claim 1, wherein
in the two-stage structural diaphragm,
one of the first diaphragm and the second diaphragm is integrally formed as a part of a lens barrel of the projection optical system, while
the other of the first diaphragm and the second diaphragm is a mounting member separate from the lens barrel.

9. The virtual image display apparatus according to claim 8, wherein
the mounting member is a black sheet member.

10. The virtual image display apparatus according to claim 1, further comprising
a light-guiding member including a transmissive reflective surface covering, when the virtual image display apparatus is worn by an observer, the front of eyes of the observer.

11. A virtual image display apparatus comprising:
an imaging element configured to display an image;
a projection optical system configured to project an image from the imaging element; and
a two-stage structural diaphragm including a first diaphragm forming a first aperture portion in the projection optical system, and a second diaphragm forming a second aperture portion in the projection optical system, wherein
in the two-stage structural diaphragm, the second diaphragm is disposed, on an optical path, at a position closer to the imaging element than the first diaphragm is,
the first diaphragm and the second diaphragm are diaphragms for different directions and
in the two-stage structural diaphragm, one of the first diaphragm and the second diaphragm is integrally formed as a part of a lens barrel of the projection optical system, while the other of the first diaphragm and the second diaphragm is a mounting member separate from the lens barrel.

12. The virtual image display apparatus according to claim 11, wherein
the projection optical system includes at least one lens disposed between a diaphragm position of the first diaphragm and a diaphragm position of the second diaphragm.

13. The virtual image display apparatus according to claim 11, wherein
the mounting member is a black sheet member.

14. The virtual image display apparatus according to claim 13, wherein
the black sheet member is affixed to and extends around at least a part of a lens constituting the projection optical system.

15. The virtual image display apparatus according to claim 11, wherein
the mounting member includes a plurality of holes corresponding to a plurality of bosses for positioning provided in the projection optical system or at a lens barrel.

16. The virtual image display apparatus according to claim 15, wherein
bosses for positioning are symmetrically disposed in the projection optical system.

17. The virtual image display apparatus according to claim 15, wherein
the bosses for positioning abut against the projection optical system or the lens barrel for positioning in an optical axis direction.

18. The virtual image display apparatus according to claim 15, wherein
the bosses for positioning and the plurality of holes corresponding to the bosses include bosses and holes having shapes different from the other bosses and holes.

19. A virtual image display apparatus comprising:
an imaging element configured to display an image;
a projection optical system configured to project an image from the imaging element; and
a two-stage structural diaphragm including a first diaphragm forming a first aperture portion in the projection optical system, and a second diaphragm forming a second aperture portion in the projection optical system, wherein
in the two-stage structural diaphragm, the second diaphragm is disposed, on an optical path, at a position closer to the imaging element than the first diaphragm is,
the first diaphragm and the second diaphragm are diaphragms for different directions, and
the projection optical system includes at least one lens disposed between a diaphragm position of the first diaphragm and a diaphragm position of the second diaphragm.

* * * * *